United States Patent [19]

Fruzzetti

[11] 4,399,690
[45] Aug. 23, 1983

[54] VACUUM LEAK DETECTOR HAVING SINGLE VALVE ASSEMBLY

[75] Inventor: Paul Fruzzetti, North Easton, Mass.

[73] Assignee: Varian Associates, Inc., Palo Alto, Calif.

[21] Appl. No.: 335,009

[22] Filed: Dec. 28, 1981

Related U.S. Application Data

[63] Continuation of Ser. No. 100,061, Dec. 4, 1979, abandoned.

[51] Int. Cl.³ .......................................... G01M 3/20
[52] U.S. Cl. .................................... 73/40.7; 137/636.1
[58] Field of Search ................. 72/40.7; 250/281, 288; 137/636.1

[56] References Cited

U.S. PATENT DOCUMENTS

| | | | |
|---|---|---|---|
| 2,279,693 | 4/1942 | Martin | 137/636.1 |
| 3,327,521 | 6/1967 | Briggs | 73/40.7 |
| 3,416,359 | 12/1968 | Durbin et al. | 73/40.7 |
| 3,626,760 | 12/1971 | Briggs et al. | 73/40.7 |
| 3,690,151 | 9/1972 | Briggs | 73/40.7 |
| 3,914,983 | 10/1975 | Ichiro | 73/40.7 |
| 3,968,675 | 7/1976 | Briggs | 73/40.7 |

Primary Examiner—James J. Gill
Attorney, Agent, or Firm—Stanley Z. Cole; Leon F. Herbert

[57] ABSTRACT

Equipment is monitored for leaks by a mass spectrometer responsive to a low molecular weight test gas. A diffusion pump has a foreline and an inlet connected in fluid flow relation with the spectrometer. A three position valve assembly has ports connected to a roughing pump line, to an inlet conduit for receiving test gas leaking through equipment, and to the foreline. The assembly has: (1) a vent position wherein gas from the inlet conduit is blocked from the roughing pump line and the foreline so that the inlet conduit can be vented without having gas from the inlet conduit flow to the roughing pump line and foreline, (2) a start position wherein gas from the inlet conduit flows to the roughing pump line while being blocked from the foreline, and (3) an operate position wherein gas from the inlet conduit flows to the roughing pump line and low molecular weight gas flows from the inlet conduit to the mass spectrometer through the diffusion pump and heavier gases are substantially prevented by the diffusion pump from flowing from the inlet conduit to the spectrometer. A single handle sequentially activates the valve assembly to the vent, start and operate positions while preventing direct drive from vent to operate. First and second coaxial cams are longitudinally spaced from each other along a cam shaft that is part of the handle. The first and second cams respectively engage first and second actuators for first and second valves that establish flow paths for the three positions.

59 Claims, 10 Drawing Figures

VACUUM LEAK DETECTOR HAVING SINGLE VALVE ASSEMBLY

This is a continuation of application Ser. No. 100,061, filed Dec. 4, 1979, now abandoned.

TECHNICAL FIELD

The present invention relates generally to vacuum leak detectors and more particularly to a vacuum leak detector having a single valve assembly with ports connected to a roughing pump line, vacuum equipment being monitored, and a monitoring instrument.

BACKGROUND ART

In the prior art, it is known to detect leaks in vacuum equipment by detecting how much of a light gas, such as helium, flows into the vacuum equipment from a pressurized source in an ambient atmosphere. The vacuum equipment is connected to a filter that passes the light gas and rejects heavier gases which are in the equipment but are not to be detected. Gas passed through the filter flows to a gas monitoring instrument, such as a mass spectrometer. The vacuum equipment is evacuated to a relatively low vacuum by a mechanical fore or roughing pump while the filter and monitoring instrument are evacuated to a higher vacuum, generally by the combination of the fore pump and a higher vacuum pump, such as a diffusion pump. It is also necessary to vent the vacuum equipment and/or monitoring instrument to the atmosphere from time to time. While the vacuum equipment and monitoring instrument are vented it is desirable to disconnect the pumps from the vacuum equipment and the monitoring instrument, so that the pumps can be maintained in a vacuum state during venting and are not excessively loaded after venting. After venting has been performed, the roughing pump is connected to the vacuum equipment and monitoring instrument to evacuate them to a low vacuum level while the diffusion pump remains in a high vacuum state and no gas is permitted to flow into it. After the vacuum equipment and monitoring instrument have been evacuated to the low vacuum level by the roughing pump, the diffusion pump is connected to the monitoring instrument, to reduce the pressure in it to the high vacuum level. If only the equipment is vented, somewhat the same sequence is followed except that the monitoring instrument remains connected to the diffusion pump at all times, but a flow path between the diffusion pump and both of the roughing pump and vacuum equipment is blocked.

One type of prior art system, as disclosed in Briggs, U.S. Pat. No. 3,690,151, commonly assigned with the present invention, employs a diffusion pump as a filter to pass the light gas to the monitoring instrument to the exclusion of heavier gases, as well as for the usual purpose of evacuating the monitoring instrument. The vacuum equipment being monitored for leaks and the monitoring instrument are respectively connected to a foreline and high vacuum inlet of the diffusion pump. The diffusion pump effectively functions as a filter to enable a significant percentage of the light gas to flow from the vacuum equipment to the monitoring instrument, while virtually preventing the flow of heavy gases, such as water vapor and nitrogen, between the vacuum equipment and monitoring instrument. There is back-diffusion of the light gas through vaporized jets of a diffusion pump fluid, usually an organic oil. The heavy gases, however, cannot back-diffuse through the oil vapor jet as easily. The monitoring instrument is responsive only to the light gas leaking from the vacuum equipment and relatively accurate indications of the amount of light gas leaking from the monitored equipment are obtained. Commercial equipment utilizing this principle has been extensively marketed under the trademark "CONTRA-FLOW".

Prior art leak detectors utilizing a filter, as described broadly above, or in connection with the "CONTRA-FLOW" type device, have employed several valve assemblies to provide the required isolation between the diffusion pump, roughing pump, vacuum equipment being monitored, filter and/or analyzing instrument. The several valves must be activated in a particular sequence to provide the required isolation during venting of the vacuum equipment and/or the monitoring instrument. The valves must also provide isolation between the diffusion pump and roughing pump as well as the vacuum equipment and monitoring instrument during transitional periods when the equipment and instrument are being evacuated to the roughing pump vacuum and when the instrument is evacuated to the diffusion pump vacuum. The multiple valve assemblies employed in the prior art are relatively expensive and are subject to being operated in an incorrect sequence. If the sequence is not performed correctly, there is a compromise of the vacuum of the roughing and/or diffusion pump. Of course, if the roughing pump and/or diffusion pump vacuum is compromised, a considerable delay occurs before the desired vacuum of these pumps can be reached.

It is, therefore, an object of the present invention to provide a new and improved vacuum equipment leak detector.

Another object of the invention is to provide a new and improved valving structure for vacuum leak detecting equipment.

A further object of the invention is to provide a new and improved vacuum leak detecting apparatus having a relatively simple valving assembly that is low cost, utilizes a minimum of parts and is relatively light weight.

An additional object of the invention is to provide a new and improved vacuum leak detecting apparatus employing a valve assembly having a relatively foolproof operating sequence.

Another object of the invention is to provide a new and improved vacuum leak detecting apparatus employing a valve assembly that substantially prevents compromising the vacuum of pumps for the apparatus during venting operations and transitory periods following the venting operation, while the apparatus is being put back on line.

DISCLOSURE OF INVENTION

In accordance with the present invention, a vacuum leak detecting apparatus includes a valve assembly having a single control handle, with multiple positions. The valve assembly has different ports respectively connected to a roughing pump line which leads to a mechanical roughing pump, the vacuum equipment, and a series connected combination of a filter for passing the low molecular weight gas to the exclusion of the heavy gases, a high vacuum pump, and an analyzer, i.e., gas monitoring, instrument. The valve assembly has a vent position wherein gas from the vacuum equipment is blocked from the roughing pump line and the series combination so that the equipment is vented through a check valve without having gas from the vented equipment flow to the roughing pump line and the combination. The assembly also has a start, i.e., transitory, position during which the check valve is closed and gas from the vacuum equipment flows to the roughing pump line while being blocked from the combination. In an operate position, wherein leaks are detected, the valve assembly is activated so gas from the vacuum equipment flows to the roughing pump line and the combination. Because the valve assembly includes a single handle for activating the valve assembly to the vent, start and operate positions, the correct sequencing of the apparatus is easily attained. In a preferred embodiment, the high vacuum pump and filter, in the series combination, together comprise a diffusion pump, as disclosed in the aforementioned Briggs patent. The analyzing or monitoring instrument is typically a mass spectrometer.

To provide a relatively inexpensive and light weight valve assembly, the assembly includes first and second cams responsive to the handle position for respectively engaging first and second actuators for first and second valve seats. The first valves establishes a gas flow path between a first port connected to the vacuum equipment, a second port connected to the roughing pump line and a region within the valve assembly while the handle is in the start and operate positions. The first valve prevents gas flow between the first port and the region while the handle is in the vent position. The second valve establishes a gas flow path between the region and a third port connected to the series combination while the handle is in the operate position. The second valve prevents gas flow between the region and the third port while the handle is in the start positions. The valve assembly includes a single cam shaft on which the handle is mounted. The first and second cams are coaxial and longitudinally spaced from each other along the cam shaft on which they are carried so that turning of the handle results in turning of the cams. The cam shaft extends through a central portion of the region, on opposite sides of which are positioned the first and third ports. The first and second cams extend in generally opposite directions from the cam shaft to engage the first and second actuators which extend in straight lines in opposite directions from the regions. The first and second valves have straight line projections in opposite directions from the actuators and extend out of the region into first and second conduits that respectively terminate at the first and third ports.

To vent the analyzer, the high vacuum pump is connected between the analyzer and valve assembly. A sevice valve is connected between the high vacuum pump and analyzer, while a manually controlled vent valve for the analyzer is located in a line between the service valve and analyzer. The valve assembly, service valve, check valve and vent valve are arranged so that:

(1) with the assembly in a vent position the analyzer can be vented through the vent valve while the equipment is vented through the check valve without having air flow through the vent and check valves to the high vacuum pump or to the valve assembly so that there is virtually no loading of the roughing and high vacuum pumps at this time;

(2) with the assembly in a start, i.e., transitory, position, the analyzer and equipment can be connected to the roughing line through the valve assembly while the valve assembly is in the start position without a gas flow path being established to the high vacuum pump from either the analyzer or valve assembly whereby minimum loading of the high vacuum pump occurs while the roughing pump is evacuating the analyzer and equipment to a relatively low vacuum; and (3) with the assembly in an operate position, the analyzer is connected to the high vacuum pump while the high vacuum foreline and the roughing pump line are connected to the vacuum equipment through the valve assembly.

In a preferred embodiment, a shunt conduit is provided between the service valve and a portion of the valve assembly, between the second and third ports. The shunt conduits electively by-passes the high vacuum pump and filter, and enables decoupling of the roughing line and high vacuum pump from the analyzer and/or vacuum equipment during venting, with a minimum number of components.

An additional object of the invention is to provide a new and improved leak detector apparatus having a valve assembly with a single control handle.

Another object of the invention is to provide a new and improved vacuum leak detector apparatus having a valve assembly with a single cam shaft for multiple cams, which shaft is driven by a single handle sequentially to a vent position, a start or transitory position and an operate position.

The above and still further objects, features, and advantages of the present invention will become apparent upon consideration of the following detailed description of one specific embodiment thereof, especially when taken in conjunction with the accompanying drawings.

BRIEF DESCRIPTION OF DRAWINGS

FIG. 7 is a front view of the valve block;

BEST MODE FOR CARRYING OUT THE INVENTION

Figure 1:
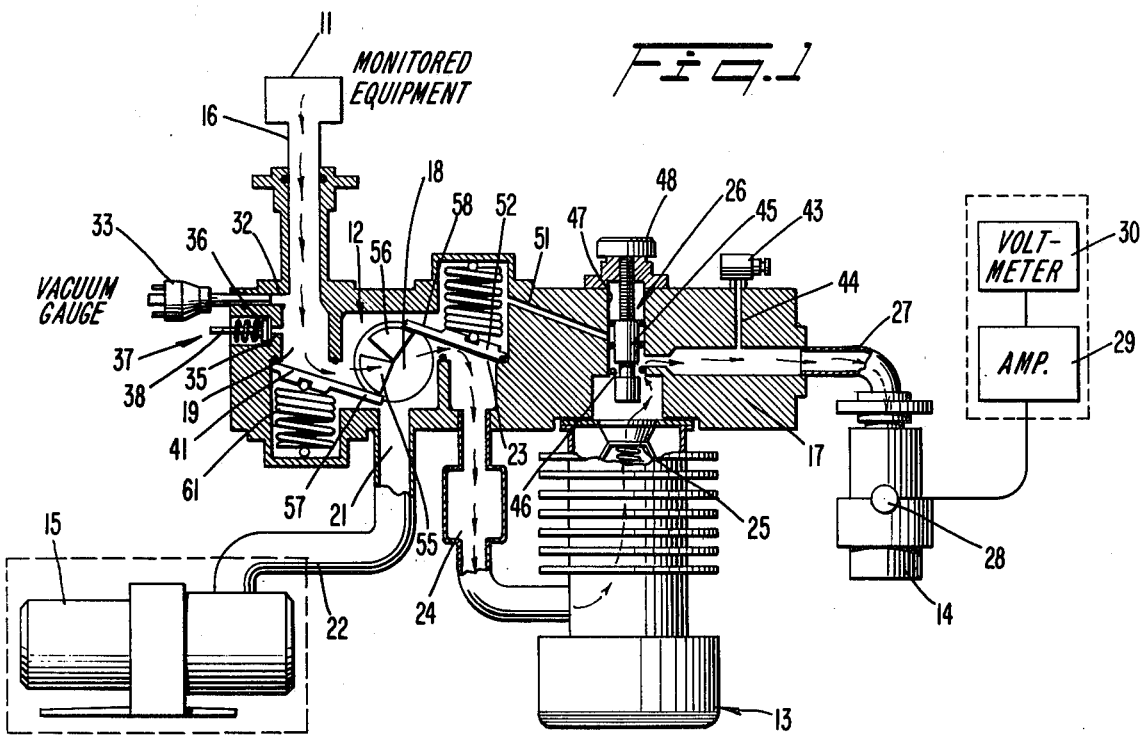
FIG. 1 is a schematic diagram of a leak detector in accordance with a preferred embodiment of the present invention in an operate or test position.

Reference is now made to FIG. 1 of the drawings wherein vacuum equipment 11 being monitored for leaks is connected by valve assembly 12 and high vacuum diffusion pump 13 to a gas analyzer instrument, preferably in the form of spectrometer tube 14. Diffusion pump 13 enables low molecular weight gases, e.g., helium, from equipment 11 to pass to spectrometer tube 14, to the exclusion of heavy gases such as water vapor and nitrogen. Pump 13 evacuates spectrometer tube 14 to a relatively high vacuum, typically on the order of $10^{-6}$ torr. In a preferred embodiment, vacuum diffusion pump 13 is of a type disclosed in the copending, commonly assigned application of Arthur A. Landfors, entitled "Diffusion Pump for Leak Detector", filed Jan. 17, 1978, and bearing Ser. No. 870,234.

To enable spectrometer tube 14 to be evacuated to the pressure which can be achieved by pump 13, it is necessary to employ a roughing or fore pump, such as mechanical vacuum pump 15. Pump 15 reduces the pressure within equipment 11 and valve assembly 12 to a higher pressure, such as $10^{-2}$ torr, while pump 13 is decoupled from the remainder of the apparatus. Whenever it is desired to vent equipment 11 and/or spectrometer tube 14 to the atmosphere, valve assembly 12 is adjusted so that pumps 13 and 15 are disconnected from lines to the vacuum equipment and the spectrometer.

In normal operation, to determine a leak in vacuum equipment 11, a relatively low molecular weight pressurized gas, such as helium, is applied to the periphery of the equipment. Helium applied to the exterior of equipment 11 passes through any leaky areas in the equipment and is sucked by pump 15 through conduit 16, between a port in equipment 11 and a port in valve body 17 into central region 18 of valve assembly 12. The gas from equipment 11 flows into central region 18 by way of a first port 19 in the valve assembly. The relatively heavy, high molecular weight gases flowing through port 19 into central region 18 flow through a second port 21 of valve assembly 12 to roughing line 22, which is connected to an inlet of roughing pump 15. Some of the low molecular weight gas also flows through port 21 to pump 15 by way of line 22.

A considerable portion of the low molecular weight gas also flows through a third port 23 of central region 18 into foreline 24 of diffusion pump 13. Because of reasons set forth in the Briggs patent, diffusion pump 13 allows the relatively low molecular weight gas from foreline 24 to flow to port 25. In conventional diffusion pumps, port 25 is referred to as an inlet because gas from equipment being evacuated to a pressure of $10^{-6}$, for example, flows through port 25 to foreline 24. However, in a diffusion pump of the type constructed in accordance with the previously mentioned Briggs Patent and the previously mentioned copending application, relatively low molecular weight gases flow in a backward direction through pump 13. The higher molecular weight gases in equipment 11, however, do not flow from foreline 24 to port 25, because diffusion pump 13 effectively functions as a filter to prevent back diffusion of the heavy molecular weight gases through an oil vapor jet of the diffusion pump. The low molecular weight gases flowing through port 25 are supplied to spectrometer tube 14 by way of service valve 26 and conduit 27. The path from port 23 can thus be considered as the series combination of a filter for passing low molecular weight gases to the exclusion of high molecular weight gases and a high vacuum pump, both of which are included in diffusion pump 13, as well as service valve 26.

The low molecular weight gas flowing through conduit 27 is monitored by spectrometer tube 14. Spectrometer tube 14 includes a collector 28 on which is derived an electrical signal. The electrical signal derived by collector 28 is indicative of the amount of helium leaking through equipment 11 and supplied to an output device including electronic amplifier 29. Amplifier 29 drives a suitable voltmeter 30, which provides a reading indicative of leak rate of equipment 11. When the helium source is removed from equipment 11, the helium remaining in the system is rapidly pumped away. The reading from meter 30 thus rises and falls when the helium source is applied and removed to provide an indication of the nature of leaks in equipment 11.

It is frequently desirable to determine the pressure in vacuum equipment 11. To this end valve block 17 is provided with a conduit 32 connected directly in fluid flow relationship with conduit 16. Conduit 32 is connected to vacuum gauge 33, of a conventional type, which enables the pressure in conduit 16 and equipment 11 to be determined.

It is also necessary and/or desirable to vent equipment 11 to the atmosphere while the equipment is connected to valve block 17. To this end, conduit 16 is coupled by conduit 35, in valve block 17, to valve seat 36 on spring biased vent check valve 37. Conduit 35 is positioned in conduit 16 upstream of port 19, leading into the central section 18 of valve assembly 12. Prior to venting conduit 16 to the atmosphere, port 19 is disconnected from central section 18, a result achieved by urging roughing valve 41 against port 19 at the end of conduit 16 extending into valve block 17. With conduit 16 closed by valve 41, the introduction of air into conduit 16 by removal of vacuum equipment 11 from the conduit, or tipping valve stem 38 of vent valve 37 has no effect on the pressure in roughing line 22 or foreline 24, and thereby no effect on the operation of diffusion pump 13 or roughing pump 15. Valve stem 38 is automatically tipped to open vent valve 37, when the valve control handle is in the vent position, by a detent plate coupled to the handle engaging the stem, as described in detail infra. Valve 41 thus isolates pumps 13 and 15 from vented line 16 so that it is not necessary to restart the pumping cycle when vacuum equipment 11 is being changed or venting occurs in line 16.

It is also desirable to vent spectrometer tube 14 from time to time. To this end, manually activated vent valve 43 is connected in shunt with line 27 by way of conduit 44 in valve block 17. Vent valve 43 cooperates with service valve 26 to evacuate spectrometer tube 14, while isolating pumps 13 and 15 from line 27. In particular, service valve 26 includes a spool 45 having a circumferential notch 46, approximately mid-way along the length of the spool. Spool 45 is longitudinally translatable in bore 47 of valve block 17, by virtue of a connection between the end of the spool remote from port 25 and thumb knob 48. In normal operation, notch 46 is positioned so that relatively low molecular weight gas passing through port 25 of pump 13 flows around the spool into the notch and through conduit 27 to spectrometer tube 14. However, spool 45 can be longitudinally translated upwardly relative to the position illustrated in FIG. 1, so that port 25 is blocked from conduit 27. In one position, notch 46 enables gas to flow between conduit 27 and conduit 51 within block 17. Conduit 51 is connected between service valve 26 and central region 18 of valve assembly 12 to selectively provide a shunt path for gases around diffusion pump 13 while the diffusion pump is blocked from conduit 27. In still another positon of spool 45, the lower part of the spool blocks conduit 27 from port 25, as well as from conduit 51. In the latter condition, conduit 27 and spectrometer tube 14 are isolated from both diffusion pump 13 and mechanical, roughing pump 15, regardless of the position of valve members 41 and 52 within valve assembly 12.

To prevent overloading of diffusion pump 13 during a start or transitory period after venting of equipment 11 and/or spectrometer 14, foreline 24 is decoupled from central region 18 of valve assembly 12. To this end, valve assembly 12 includes a test valve 52 which selectively opens and closes port 23 relative to central region 18. In normal, test operating conditions, as illustrated in FIG. 1, valve 52 is off of port 23, enabling the relatively low molecular weight gases to flow from central region 18 through pump 13 into spectrometer tube 14.

To control valve 41 and 52, valve assembly 12 is provided with a pair of cams 55 and 56, mounted coaxially at displaced longitudinal positions on a common shaft, which is manually turned by a single control knob mounted on the shaft, as described infra. Cams 55 and 56 respectively engage roughing and test valve actuators 57 and 58 for roughing the test valves 41 and 52. Valve actuator 57 and valve 41 extend in a straight line in a first direction from central region 18. Valve actuator 58 and valve 52 extend in a straight line, in a second direction, opposite from the first direction, from region 18. The valve actuators and valves extending in opposite directions are generally oppositely positioned in region 18, on opposite sides of the coaxial cam shaft for cams 55 and 56. This arrangement minimizes the complexity, number of parts, expense and weight of valve assembly 12. Roughing and test valves 41 and 52 are normally spring biased by roughing and test compression springs 61 and 62 against ports 19 and 23, respectively. Spring 61 is held in situ within valve block 17 in longitudinal alignment with conduit 16, opposite from port 19, while spring 62 is held in situ within the valve block, in alignment with foreline 24, opposite from port 23. The bias effects of springs 61 and 62 are overcome during normal operation by the ends of valve actuators 55 and 56 remote from valve 19 and 23 being engaged by the peripheries of cams 55 and 56, respectively.

In normal operation, while a leak test is being performed, a handle 85 for the cam shaft is in a "test" position and the apparatus is adjusted as illustrated in FIG. 1. In particular, valves 41 and 52 are off of ports 19 and 23, while vent valves 37 and 43 are closed. Simultaneously, service vlave 26 is adjusted so that knob 48 translates spool 45 to the end of conduit 47, whereby a flow path exists from port 25 of pump 13 to conduit 27 and shunt conduit 51 is blocked by the upper portion of spool 45. Under these circumstances, pump 15 maintains equipment 11, conduit 16, central region 18 of valve assembly 12 and foreline 24 at a rough vacuum, on the order of $10^{-2}$ torr. Simultaneously, diffusion pump 13 maintains port 25, conduit 27 and spectrometer tube 14 at a high vacuum, typically on the order of $10^{-6}$ torr. As described supra, the helium gas passes through leaks in equipment 11 and is detected by spectrometer tube 14, to enable the nature and size of leaks in equipment 11 to be determined.

Figure 2:
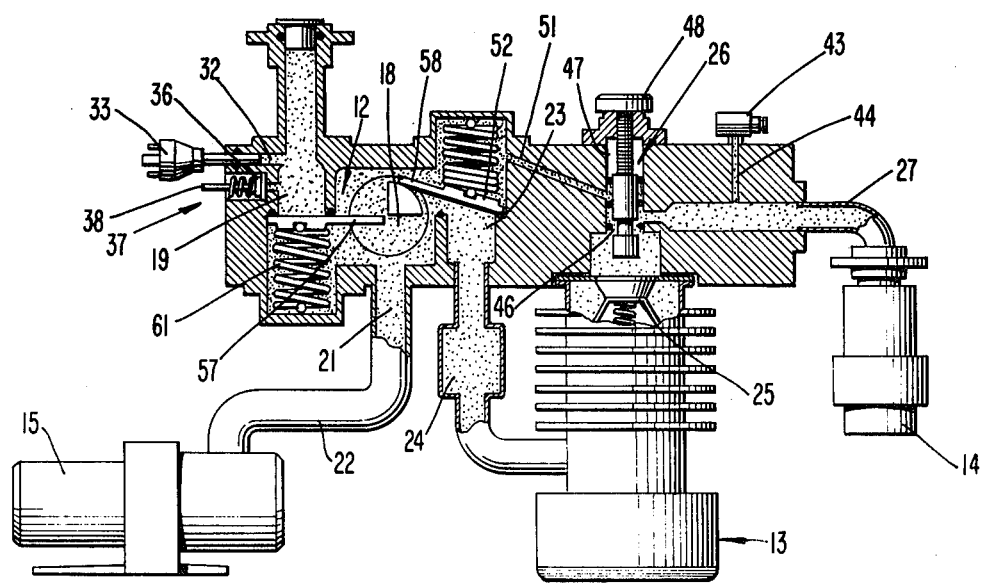
FIGS. 2 and 3 are schematic diagrams indicating the positions of valves in the apparatus of FIG. 1 for vent and start conditions, with a service valve for controlling venting of a mass spectrometer type gas analyzer in a closed position.

If it is desired to change the vacuum equipment being monitored or to vent conduit 16 for any reason, the handle is turned 90 degrees clockwise causing the cam shaft for cams 55 and 56 to be rotated 90 degrees clockwise from the position shown in FIG. 1, to a vent position, as illustrated in FIG. 2. In the vent position, cam 55 is rotated so that it no longer engages valve actuator 57, but cam 56 remains in contact with valve actuator 58. Thereby, valve 41 closes against port 19, while valve 52 leaves port 23 in communication with the central region 18 of valve assembly 12. In response to valve 41 closing port 19, conduit 16 is disconnected from central region 18, whereby the atmospheric pressure which exists in conduit 16 at this time has no effect on anything within the central region or downstream from it. Thereby, the pressures of pumps 13 and 15 are not altered so venting of conduit 16 has no adverse loading effects on the pumps.

Figure 3:
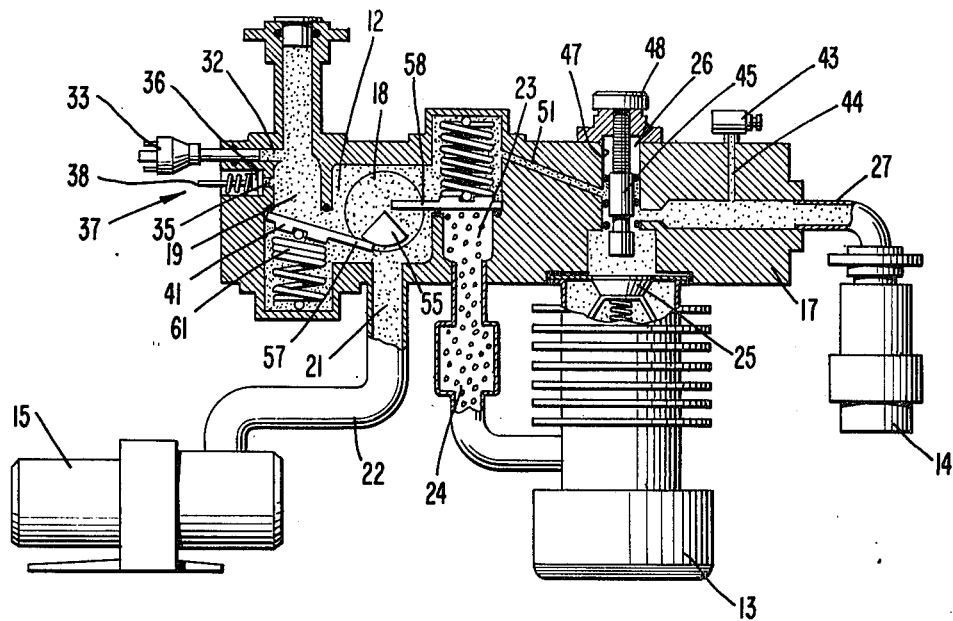

After vacuum equipment 11 has been replaced and/or it is no longer desirable to vent conduit 16, i.e., upon completion of the venting operation, the cam shaft for cams 55 and 56 is rotated clockwise 180 degrees from the vent position to a start position. In the start position, cams 55 and 56 are positioned as illustrated in FIG. 3, whereby valve 52 closes port 23, while valve 41 opens port 19. This result is achieved because the cam shaft drives cam 56 out of engagement with valve actuator 58, while cam 55 engages valve actuator 57. The positions of cams 55 and 56 in combination with the actuators 57 and 58 are such that valve 52 closes port 23 prior to valve 41 opening port 19. Thereby, vacuum integrity is maintained in foreline 24 prior to roughing line 22 and roughing pump 15 being coupled to conduit 16, while the conduit is substantially at amospheric pressure. Thus, the vacuum integrity and load of diffusion pump 13 are not adversely affected when roughing line 22 and pump 15 are exposed to the atmospheric pressure of conduit 16. Valves 41 and 52 remain in the position illustrated in FIG. 3 until the pressure read from gauge 33 has reached a sufficiently low value to enable vacuum pump 13 to be connected back into the system without adverse effects. At that time, the control handle for the cam shaft of cams 55 and 56 is rotated 90 degrees to the test position so that valves 41 and 52 are driven to the open position as illustrated in FIG. 1.

Figure 4:
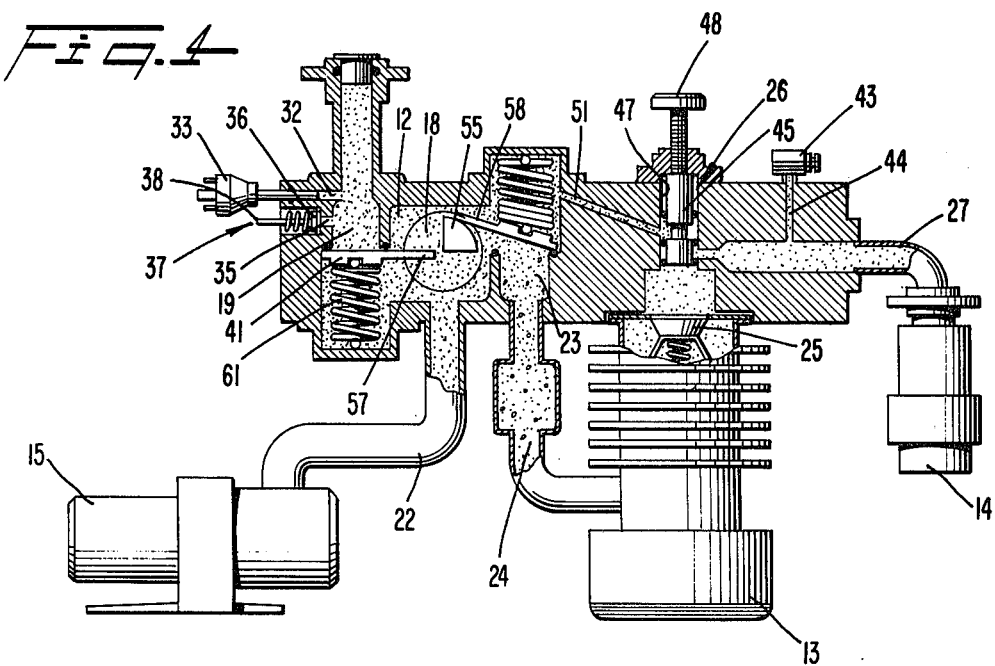
FIG. 4 is a schematic diagram of the apparatus illustrated in FIG. 1 wherein the service valve is completely closed and the valve assembly is activated to a vent position.

Consideration is now given to the operations which are performed while spectrometer tube 14 and conduit 16 are both vented to the atmosphere by reference to FIG. 4. Initially, valve assembly 12 is activated so that roughing valve 41 is closed on port 19 while test valve 52 is open from port 23, the same condition of valve assembly 12 as illustrated in FIG. 2 and which is achieved by turning the control handle for the cam shaft for cams 55 and 56 to the vent position. Then, thumb knob 48 is turned so that spool 45 is driven longitudinally as far as possible in bore 47 toward the top surface of valve body 17. Thereby, slot 46 in spool 45 is above the port of conduit 27 leading into bore 47, and the lower portion of the spool covers the port or conduit 27. Conduit 27 is thus disconnected from port 25 of vacuum diffusion pump 13. Then, vent valve 43 is manually activated by pushing a plunger thereof, so that conduit 27 and spectrometer tube 14 are vented to the atmosphere. At this time, conduit 16 is also vented to the atmosphere by automatic control of vent valve 37. Under these conditions, a high vacuum continues to exist at port 25 of diffusion pump 13, while a lower, roughing vacuum exists in foreline 24, central portion 18 of valve assembly 12, and roughing line 22. Thereby, while spectrometer tube 14, and/or conduit 16 are vented to the atmosphere, there is no adverse effect on the pressure and load of pumps 13 and 15.

Figure 5:
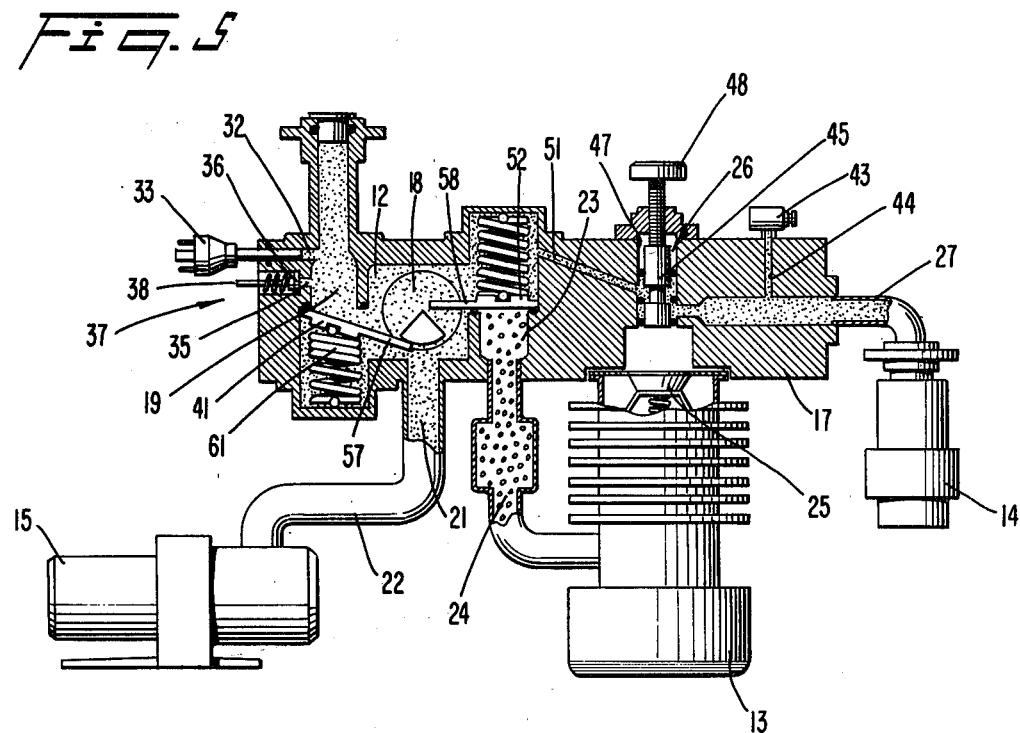
FIG. 5 is a schematic diagram of the apparatus illustrated in FIG. 1 wherein the service valve is activated to a start position and the valve assembly is activated to a start position.

When it is desired to put the apparatus back into an operate condition, i.e., when venting of spectrometer tube 14 and conduit 16 has been completed, vent valve 43 is closed, while vaccum equipment 11 is connected to conduit 16. Then, the cam shaft for cams 55 and 56 is rotated clockwise 180 degrees from the vent to the start position, as illustrated in FIG. 5. With the cam shaft in the start position, test valve 52 closes on port 23, while roughing valve 41 is activated to an open condition. Thereby, foreline 24 is disconnected from central region 18 of valve assembly 12 while conduit 16 is being evacuated by roughing pump 15. As described supra, to prevent excessive loading of diffusion pump 13, valve 52 closes before valve 41 opens.

With cams 55 and 56 driven to the start position, spool 45 is driven downwardly approximately half-way of its travel in bore 47 by turning knob 48. Thereby, notch 46 in spool 45 is positioned in communication with ports at the ends of conduits 27 and 51, to establish a fluid flow path from roughing pump 15 through roughing line 22, central region 18 and conduits 51 as well as 27 to spectrometer tube 15. Simultaneously, spool 45 blocks any connection between diffusion pump port 25 and conduits 51 and 27. Thereby, spectrometer tube 14 is pumped to a roughing vacuum by pump 15, without adversely affecting the pressure and load of diffusion pump 13 because the diffusion pump foreline 24 and port 25 are closed.

After spectrometer tube 14 has been evacuated to a suitable pressure by roughing pump 15, as indicated by vacuum gauge 33 which is substantially at the same pressure as the spectrometer tube during the transitory or start position of cams 55 and 56 and the position of service valve 26 illustrated in FIG. 5, cams 55 and 56 are rotated 90 degrees to the test position. Then, service valve 26 is activated so that spool 45 is driven as far as possible into bore 47 to enable spectrometer tube 14 to be evacuated to the relatively low vacuum state at port 25 of diffusion pump 13 while the remainder of the apparatus is decoupled from the diffusion pump port 25. Thereby, no adverse effects are produced on the load and/or pressure of the diffusion pump. The system is now back in an operate condition as illustrated in FIG. 1 so that meter 30 can provide an indication of leakage of equipment 11.

Figure 6:
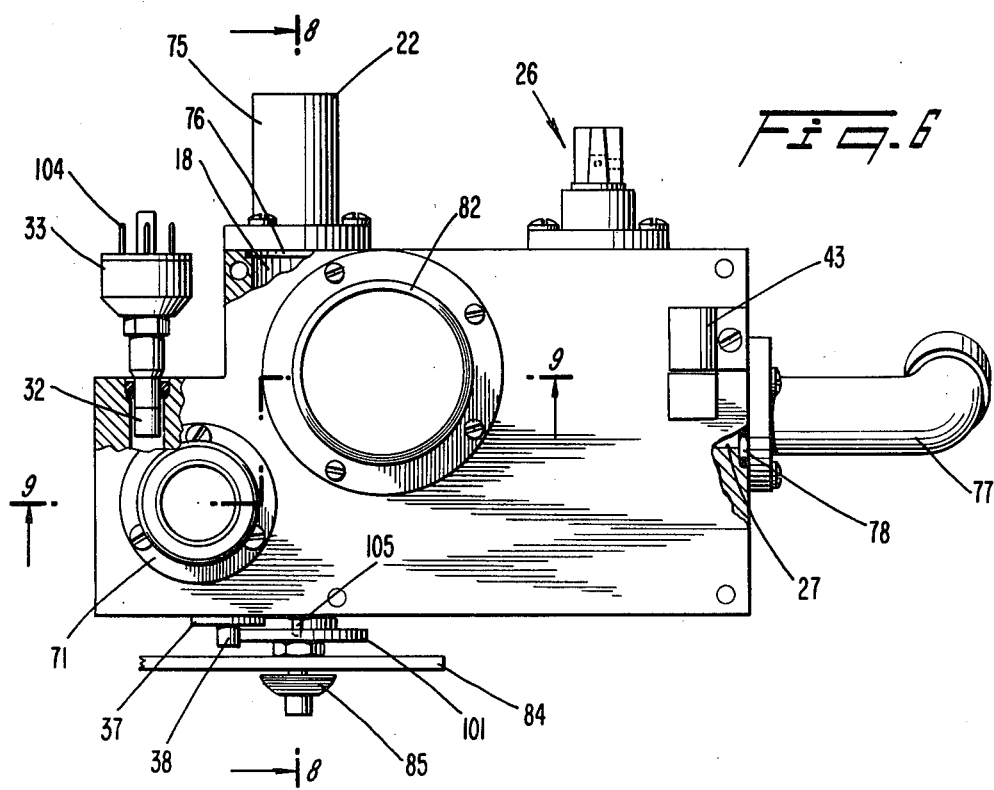
FIG. 6 is a top view of a valve block for the valve assembly and some of the other structure illustrated in FIG. 1.
Figure 1:
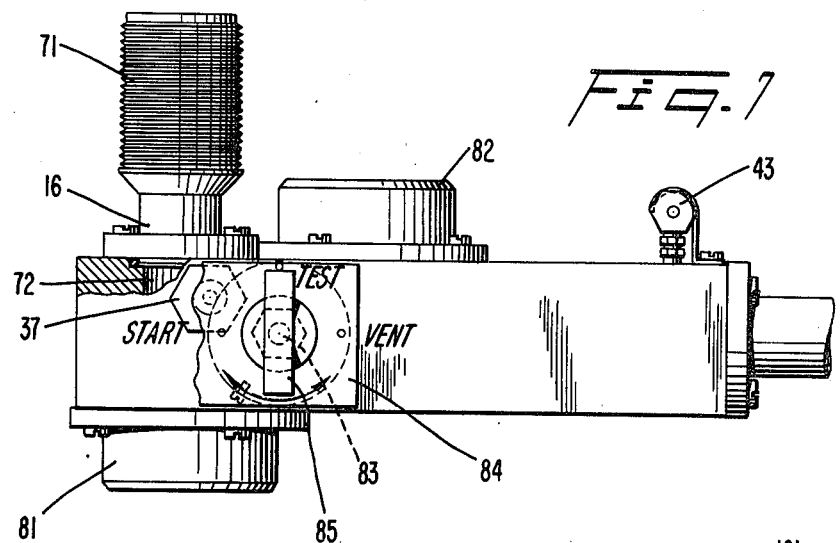
Figure 8:
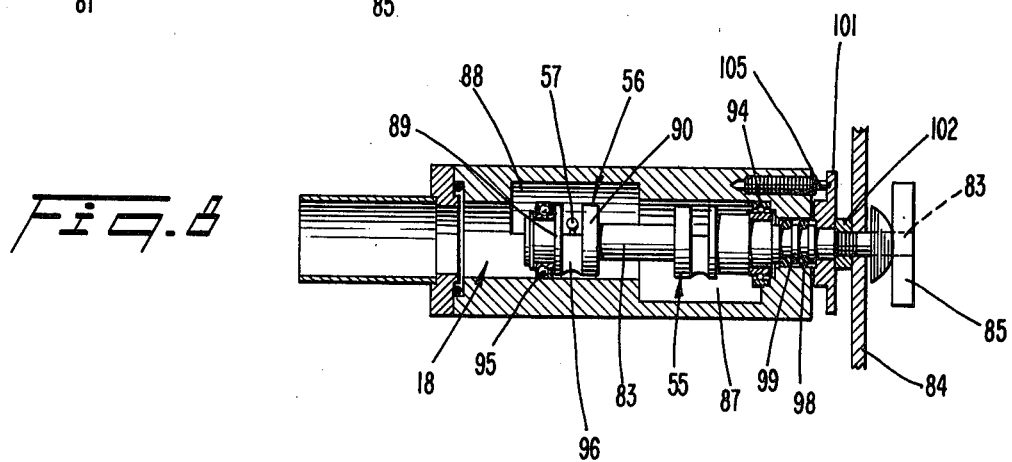
FIG. 8 is a side sectional view of the cam and cam shaft arrangement in the block illustrated in FIG. 6.
Figure 9:
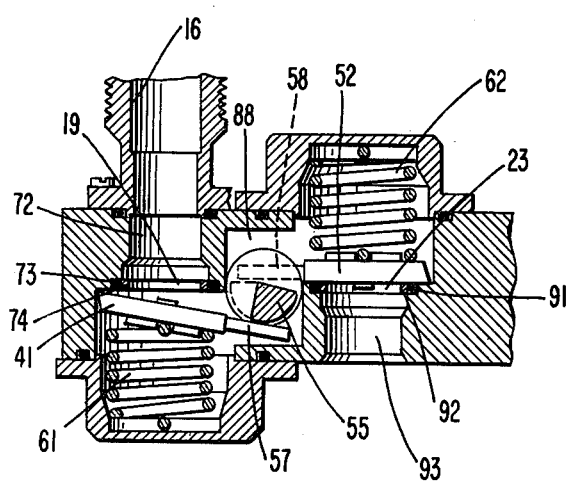
FIG. 9 is a side sectional view of the valve assembly, particularly illustrating the structure to control flow between the vacuum equipment and valve assembly.
Figure 10:
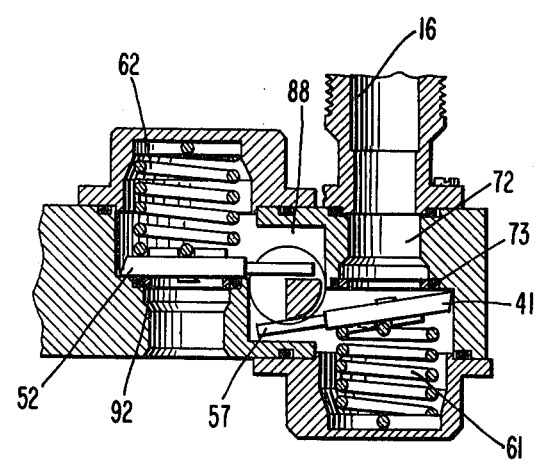
FIG. 10 is a further side sectional view of the valve assembly, particularly illustrating the structure to control flow between a fore line of a diffusion pump and valve assembly.

Reference is now made to FIGS. 6 and 7 of the drawings wherein there are respectively illustrated top and side views of valve block 17 and the exterior positions of the components mounted thereon. Valve block 17 is generally in the form of a right parallelepiped, having a rectangular notch in the back left corner thereof, as illustrated in FIGS. 6 and 7. Equipment 11 to be tested is connected to inlet manifold 71, which extends from the top surface of block 17, through which conduit 16 also extends into vertical bore 72 of the valve block. Bore 72 is terminated by concentric O ring 73 and backup ring 74 which are effectively positioned at port 19, FIG. 9.

Extending from the back face of valve block 17 is roughing manifold pipe 75 through which conduit 22 extends into central region 18 of valve assembly 12. One end of pipe 75 is connected to central region 18 by O ring 76, effectively positioned at port 21 between conduit 22 and the central region. Spectrometer tube manifold or pipe 77, which contains conduit 27, is conncted to the right side of body 17 and is terminated at O ring 78.

Service valve 26 extends from the back side of valve body 17, between the right edge of the valve body and roughing pump manifold or pipe 75. Vent valve 37 extends from the front side of valve body 17, and is positioned slightly to the left of roughing pump manifold 75. Spectrometer tube vent valve 43 is positioned on the top of valve block 17, at the right side thereof, in proximity to the region where conduit 27 within the valve body is connected to spectrometer tube manifold 77.

On the bottom and top faces of valve block 17 are respectively mounted valve caps 81 and 82 for roughing valve spring 61 and test valve spring 62. Valve cap 81 has a longitudinal axis generally aligned with a longitudinal axis of manifold 71, the vertically extending longitudinal axis of valve cap 82 is displaced to the right from that of valve cap 81. Three position detented cam shaft 83 for cams 55 and 56 extends through the front wall of valve block 17 in a horizontal direction, between valve caps 81 and 82. One end of cam shaft 83 extends through instrument panel 84 of a housing for all of the apparatus of the present invention, except for the possibility of the roughing pump 15, which can be in an external housing. Cam shaft 83 is held in situ by bearings 94 and 95, fixedly mounted in the walls of rectangular cavities 87 and 88 having a common interface. At the one end of cam shaft 83 is handle 85 which is adapted to be gripped by an operator and includes a pointer which selectively points to indicia on panel 84. The indicia on panel 84 carry the notations "vent", "start" and "test". All three of the indicia are located on a common circle having the center thereof coincident with the longitudinal axis of shaft 83. The vent and start indicia are displaced 180 degrees from each other relative to the axis of shaft 83, while the test indicia are spaced 90 degrees from both the start and vent indicia.

Cam shaft 83 carries cams 55 and 56 which selectively engage valve actuators 57 and 58. Cams 55 and 56 are coaxial with each other and cam shaft 83, so the cams are longitudinally disposed along the cam shaft, with cam 55 in front of cam 56. Valve actuators 57 and 58 are similarly disposed so that actuator 57 is engged only by cam 55 and actuator 58 is engaged only by cam 56. Actuators 57 and 58 are rigid rods that respectively extend in opposite directions into cavities 87 and 88, within block 17.

The rods forming valve actuators 57 and 58 are captured in a cavity between parallel discs 89 and 90, which are spaced from each other along the longitudinal axis of cam shaft 83 by eccentric disc 96 which carries the rod. Because cavities 87 and 88 have a common interface, the two cavities together form a significant portion of central region 18 of valve assembly 12. The portions of cavities 87 and 88 having the common interface are vertically aligned. Cavity 87 extends to the left of the vertically aligned portions of cavities 87 and 88, while cavity 88 extends to the right of the common portion. Cavity 88 communicates with conduit 18 to provide a gas flow path between the fore pump and central portion 18 of valve assembly 12. The left and right portions of cavities 87 and 88 extend downwardly and upwardly, respectively, into wells of caps 81 and 82. The well of cap 81 and the left side of cavity 87 contain compression spring 61, while the right portion of cavity 88 and the well of cap 82 contain compression spring 62. The upper and lower ends of compression springs 61 and 62 are fixedly mounted in suitable slots in valves 41 and 52 and in the bottoms of the wells in caps 81 and 82.

Cams 55 and 56 have arcuate circumferential spaced segments when viewed from the direction of the longitudinal axis of cam shaft 83. The separation between adjacent radial edges of cams 55 and 56 is approximately 10 degrees, and each of the cams has an angular extent of approximately 90 degrees. Such an arrangement of cams 55 and 56 relative to valve actuators 57 and 58 enables both valves 41 and 52 to be simultaneously open from ports 19 and 23 in the test position of cam shaft 83, while enabling valve 41 to close against port 19 in the vent position of cam shaft 83 and valve 52 to close against port 23 in the start position of cam shaft 83.

In the closed position, valve 52 presses against the concentric combination of O ring 91 and backup ring 92, at the end of cylindrical bore 93 that extends vertically through valve body 17 and has a longitudinal axis coincident with the axes of the well in valve cap 82 and spring 62. Rings 91 and 92 are positioned in port 23. Conduit 93 is connected to foreline 24 of vacuum diffusion pump 13. Port 25 of pump 13 is connected to a conduit (not shown) in the interior of body 17 by way of a port in the bottom face of the body. The port in body 17 leading to diffusion pump 13 is generally spaced from the right edge of the valve body by approximately the same distance as the spacing of service valve 26 from the right side of the valve body. Vacuum integrity between cavity 87 and the exterior of valve block 17 is provided by a pair of coaxial O rings 98 that are longitudinally spaced from each other and snuggly fit between cam shaft 83 and horizontally extending bore 99 on the front side of valve body 17.

Detent plate 101 is carried by cam shaft 83 on the front side of valve body 17 and is secured in situ by jam nut 102 which is threaded onto cam shaft 83 so that the jam nut engages a face of the detent plate remote from the front side of valve body 17. Detent plate 101 is provided with detents, in the form of machined dimples, that mate with and engage a spring biased pin 105 on valve body 17, to enable the cam shaft to be rotated to the three positions associated with the vent, start and test indicia. The machined dimple on detent plate 101 for the vent position is very deep but is ramped on one side to permit clockwise turning of cam shaft 83 from the vent to the start positions and prevent the counter clockwise rotation of the cam shaft from the vent to the test positions. The machined dimples on the plate for the test and start positions are shallower, to enable rotation of cam shaft 83 in either direction from these positions. A further dimple is provided on plate 101, between start and vent, to stop cam shaft 83 about 10 degrees before the vent position when the shaft is being turned from start to vent. This stop is employed if equipment 11 is a large load that takes a long time to be evacuated by pump 15 while cam shaft 83 is in the start position. In such an event, the filament of spectrometer tube 14 is likely to be extinguished, as indicated by a lamp (not shown), because of excessive pressure in the spectrometer tube. In such an event, shaft 83 is rotated back to the dimple which causes the shaft to stop 10 degrees before the vent position. In this position of shaft 83, spectrometer tube 14 is connected to foreline 24 and roughing pump 15 via diffusion pump 13, whereby a high operating vacuum is again provided in the spectrometer tube, and the vacuum in equipment 11 which has been established by pump 15 is preserved. The spectrometer tube can thus be re-started without adversely affecting the loads of pumps 13 and/or 15. If equipment 11 has substantial leaks and pump 15 cannot evacuate it to the proper level, cam shaft 83 is rotated back to the vent position, to enable removal of the equipment. In the vent position, valve stem 38 is tipped by a lobe in the form of screw head 109 on detent plate 101, to open valve 37 automatically.

In the indented, cut-out portion in the back left corner of valve body 17 is mounted vacuum gauge 33. Gauge 33 includes an interior conduit which leads into a horizontally extending bore of body 17, which bore forms conduit 32. Bore 32 terminates in bore 72, FIG. 9, to provide a gas flow path between conduit 16 and vacuum gauge 33. Vacuum gauge 33 includes output electrodes 104 which are connected to an electrical meter (not shown) mounted on front panel 84, where voltmeter 30, for indicating leak rate, is also mounted.

While there has been described and illustrated one specific embodiment of the invention, it will be clear that variations in the details of the embodiment specifically illustrated and described may be made without departing from the true spirit and scope of the invention as defined in the appended claims.

I claim:

1. In combination, equipment to be monitored for leaks of low molecular weight gas, such as helium, a mass spectrometer for monitoring the low molecular weight gas, a diffusion pump having a foreline and an inlet connected in fluid flow relation with the mass spectrometer, a three position valve assembly having ports respectively connected to an inlet conduit for receiving gas which may leak through equipment being tested to a roughing pump line and to the foreline, the assembly having: (1) a vent position wherein gas from the inlet conduit is blocked from the roughing pump line and the foreline so that the inlet conduit can be vented without having gas from the inlet conduit flow to the roughing pump line and the foreline, (2) a start position wherein gas from the inlet conduit flows to the roughing pump line while being blocked from the foreline, and (3) an operate position wherein gas from the inlet conduit flows to the roughing pump line and the low molecular weight gas flows from the inlet conduit to the mass spectrometer through the diffusion pump and gases of heavier molecular weight are substantially prevented by the diffusion pump from flowing from the inlet conduit to the mass spectrometer, the valve assembly having a single manually activated handle, means for mechanically coupling the handle to the valve assembly for sequentially mechanically activating the valve assembly to the vent, start and operate positions and for preventing direct activation of the valve assembly from the vent to operate positions to prevent compromising the vacuum of the diffusion pump.

2. The apparatus of claim 1 wherein the handle and the means for coupling are connected to the assembly to drive the assembly to a further position between the vent and start positions such that gas from the mass spectrometer can be pumped by the diffusion pump through the diffusion pump inlet and can be pumped from the diffusion pump foreline to the roughing pump line while the roughing line is decoupled from the inlet conduit.

3. The apparatus of claim 2 wherein the valve assembly includes first and second cams responsive to the handle position for respectively engaging first and second actuators for first and second valves, said first valve establishing: a gas flow path between a first port connected to the inlet conduit, a second port connected to the roughing pump line and a region within the valve assembly while the handle is in the start and operate positions but preventing gas flow between the first port and the region while the handle is in the vent and further positions, said second valve establishing: a gas flow path between the region and a third port connected to the diffusion pump while the handle is in the vent, operate and further positions but preventing gas flow between the region and the third port while the handle is in the start position; the diffusion pump being connected between the spectrometer and the valve assembly, a service valve connected between the diffusion pump and the spectrometer, a shunt conduit between the service valve and a portion of the valve assembly between the second and third ports, a vent valve in a line between the service valve and the analyzer; the valve assembly, service valve, shunt conduit and vent valve being arranged so that: (1) the spectrometer can be vented through the vent valve without having air flow from the vent valve assembly, (2) the spectrometer can be connected to the roughing line through the shunt conduit to the valve assembly while the valve assembly is in the start position without a gas flow path being established to the diffusion pump from either the analyzer or valve assembly, and (3) the spectrometer is connected to the diffusion pump while the diffusion pump and roughing pump line are connected to the inlet conduit through the valve assembly and the valve assembly is in the operate position.

4. The apparatus of claim 2 wherein the valve assembly includes a cam shaft on which the handle is mounted, first and second coaxial cams longitudinally spaced from each other along and carried by the cam shaft so that turning of the handle results in turning of the cams, the first and second cams respectively engaging first and second actuators for first and second valves, said first valve establishing: a gas flow path between a first port connected to the inlet conduit, a second port connected to the roughing pump line and a region within the valve assembly while the handle is in the start and operate positions but preventing gas flow between the first port and the region while the handle is in the vent and further positions; said second valve establishing: a gas flow path between the region and a third port connected to the diffusion pump while the handle is in the vent, operate and further positions but preventing gas flow between the region and the third port connected to the diffusion pump while the handle is in the start position, the means for pumping being connected between the spectrometer and the valve assembly, a service valve connected between the diffusion pump and the spectrometer, a shunt conduit between the service valve and a portion of the valve assembly between the second and third ports, a vent valve in a line between the service valve and the spectrometer; the valve assembly, service valve, shunt conduit and vent valve being arranged so that: (1) the spectrometer can be vented through the vent valve without having air flow from the vent valve assembly, (2) the spectrometer can be connected to the roughing line through the shunt conduit to the valve assembly while the valve assembly is in the start position without a gas flow path being established to the diffusion pump from either the spectrometer or valve assembly, and (3) the spectrometer is connected to the diffusion pump while the diffusion pump and roughing pump line are connected to the inlet conduit through the valve assembly and the valve assembly is in the operate position.

5. The apparatus of claim 2 wherein the valve assembly includes a cam shaft on which the handle is mounted, first and second coaxial cams longitudinally spaced from each other and carried by the cam shaft so that turning of the handle results in turning of the cams, the first and second cams respectively engaging first and second actuators for first and second valves, said first valve establishing: a gas flow path between a first port connected to the inlet conduit, a second port connected to the roughing pump line and a region within the valve assembly while the handle is in the start and operate positions but preventing gas flow between the first port and the region while the handle is in the vent and further positions; said second valve establishing: a gas flow path between the region and a third port connected to the diffusion pump while the handle is in the vent, operate and further positions but preventing gas flow between the region and the third port while the handle is in the position; said cam shaft extending through a central portion of the region, said first and third ports being generally opposite from each other in the region, and on opposite sides of the cam shaft, said first and second cams extending in generally opposite directions from the cam shaft, the first and second actuators extending in straight lines in opposite directions from the region, the first and second valves being straight line projections in opposite directions from the actuators and extending out of the region into first and second conduits terminating at the first and third ports, wherein the means for pumping is connected between the spectrometer and the valve assembly, a service valve connected between the diffusion pump and the spectrometer, a shunt conduit between the service valve and a portion of the valve assembly between the second and third ports, a vent valve in a line between the service valve and the spectrometer; the valve assembly, service valve, shunt conduit and vent valve being arranged so that: (1) the spectrometer can be vented through the vent valve without having air flow from the vent valve assembly, (2) the spectrometer can be connected to the roughing line through the shunt conduit to the valve assembly while the valve assembly is in the start position without a gas flow path being established to the diffusion pump from either the analyzer or valve assembly, and (3) the analyzer is connected to the diffusion pump while the diffusion pump and roughing pump line are corrected to the inlet conduit through the valve assembly and the valve assembly is in the operate position.

6. The apparatus of claim 1 wherein the diffusion pump is connected between the analyzer and the valve assembly, a service valve connected between the diffusion pump and the analyzer, a vent valve in a line between the service valve and the analyzer, the valve assembly, service valve and vent valve being arranged so that: (1) the analyzer can be vented through the vent valve without having air flow from the vent valve to the diffusion pump of the valve assembly, (2) the analyzer can be connected to the roughing line through the valve assembly while the valve assembly is in the start position without a gas flow path being established to the diffusion pump from either the analyzer or valve assembly, and (3) the analyzer is connected to the diffusion pump while the diffusion pump and roughing pump line are connected to the inlet conduit through the valve assembly and the valve assembly is in the operate position.

7. The apparatus of claim 1 wherein the diffusion pump is connected between the analyzer and the valve assembly, a service valve connected between the diffusion pump and the analyzer, a shunt conduit between the valve assembly and service valve, a vent valve in a line between the service valve and the analyzer, the valve assembly, service valve, shunt conduit and vent valve being arranged so that: (1) the analyzer can be vented through the vent valve without having air flow from the vent valve to the diffusion pump or to the valve assembly, (2) the analyzer can be connected to the roughing line through the shunt conduit to the valve assembly while the valve assembly is in the start position without a gas flow path being established to the diffusion pump from either the analyzer or valve assembly, and (3) the analyzer is connected to the diffusion pump while the diffusion pump and roughing pump line are connected to the inlet conduit through the valve assembly and the valve assembly is in the operate position.

8. The apparatus of claim 1 wherein the valve assembly includes first and second cams responsive to the handle position for respectively engaging first and second actuators for first and second valves, said first valve establishing: a gas flow path between a first port connected to the inlet conduit, a second port connected to the roughing pump line and a region within the valve assembly while the handle is in the start and operate positions but preventing gas flow between the first port and the region while the handle is in the vent position, said second valve establishing: a gas flow path between the region and a third port connected to the series connection while the handle is in the vent and operate positions but preventing a gas flow between the region and the third port while the handle is in the start position; the diffusion pump being connected between the analyzer and the valve assembly, a service valve connected between the diffusion pump and the analyzer, a shunt conduit between the service valve and a portion of the valve assembly between the second and third ports, a vent valve in a line between the service valve and the analyzer; the valve assembly, service valve, shunt conduit and vent valve being arranged so that: (1) the analyzer can be vented through the vent valve assembly, (2) the analyzer can be connected to the roughing line through the shunt conduit to the valve assembly while the valve assembly is in the start position without a gas flow path being established to the diffusion pump from either the analyzer or valve assembly, and (3) the analyzer is connected to the diffusion pump while the diffusion pump and roughing pump line are connected to the inlet conduit through the valve assembly and the valve assembly is in the operate position.

9. The apparatus of claim 1 wherein the valve assembly includes a cam shaft on which the handle is mounted, first and second coaxial cams longitudinally spaced from each other along and carried by the cam shaft so that turning of the handle results in turning of the cams, the first and second cams respectively engaging first and second actuators for first and second valves, said first valve establishing: a gas flow path between a first port connected to the inlet conduit, a second port connected to the roughing pump line and a region within the valve assembly while the handle is in the start and operate positions but preventing gas flow between the first port and the region while the handle is in the vent position; said second valve establishing: a gas flow path between the region and a third port connected to the series connection while the handle is in the vent and operate positions but preventing gas flow between the region and the third port while the handle is in the start position; the diffusion pump being connected between the analyzer and the valve assembly, a service valve connected between the diffusion pump and the analyzer, a shunt conduit between the service valve and a portion of the valve assembly between the second and third ports, a vent valve in a line between the service valve and the analyzer, the valve assembly, service valve, shunt conduit and vent valve being arranged so that: (1) the analyzer can be vented through the vent valve without having air flow from the vent valve assembly, (2) the analyzer can be connected to the roughing line through the shunt conduit to the valve assembly while the valve assembly is in the start position without a gas flow path being established to the diffusion pump from either the analyzer or valve assembly, and (3) the analyzer is connected to the diffusion pump while the diffusion pump and roughing pump line are connected to the inlet conduit through the valve assembly and the valve assembly is in the operate position.

10. The apparatus of claim 1 wherein the valve assembly includes a cam shaft on which the handle is mounted, first and second coaxial cams longitudinally spaced from each other along and carried by the cam shaft so that turning of the handle results in turning of the cams, the first and second cams respectively engaging first and second actuators for first and second valves, said first valve establishing: a gas flow path between a first port connected to the inlet conduit, a second port connected to the roughing pump line and a region within the valve assembly while the handle is in the start and operate positions but preventing gas flow between the first port and the region while the handle is in the vent position; said second valve establishing: a gas flow path between the region and a third port connected to the series connection while the handle is in the vent and operate positions but preventing gas flow between the region and the third port while the handle is in the start position; said cam shaft extending through a central portion of the region, said first and third ports being generally opposite from each other in the region, and on opposite sides of the cam shaft, said first and second cams extending in generally opposite directions from the cam shaft, the first and second actuators extending in straight lines in opposite directions from the region, the first and second valves being straight line projections in opposite directions from the actuators and extending out of the region into first and second conduits terminating at the first and third ports wherein the diffusion pump is connected between the analyzer and the valve assembly, a service valve connected between the diffusion pump and the analyzer, a shunt conduit between the service valve and a portion of the valve assembly between the second and third ports, a vent valve in a line between the service valve and the analyzer; the valve assembly, service valve, shunt conduit and vent valves being arranged so that: (1) the analyzer can be vented through the vent valve without having air flow from the vent valve assembly, (2) the analyzer can be connected to the roughing line through the shunt conduit to the valve assembly while the valve assembly is in the start position without a gas flow path being established to the diffusion pump from either the analyzer or valve assembly, and (3) the analyzer is connected to the diffusion pump while the diffusion pump and roughing pump line are connected to the inlet conduit through the valve assembly and the valve assembly is in the operate position.

11. Apparatus for enabling leaks of low molecular weight gas, such as helium, from equipment to be monitored by a gas analyzer responsive to the low molecular weight gas coupled to it through a filter which prevents the flow of gases of heavier molecular weight to the analyzer, the apparatus comprising: a three position valve assembly having ports connected to an inlet conduit, a roughing pump line, and the filter, the assembly having: (1) a vent position wherein gas from the inlet conduit is blocked from the roughing pump line and the filter so that the inlet conduit can be vented without having gas from the inlet conduit flow to the roughing pump line and the filter, (2) a start position wherein gas from the inlet conduit flows to the roughing pump line while being blocked from the filter, and (3) an operate position wherein gas from the inlet conduit flows to the roughing pump line and the low molecular weight gas flows from the inlet conduit to the analyzer through the filter and gases of heavier molecular weight, such as air, are substantially prevented by the filter from flowing from the inlet conduit to the analyzer, the valve assembly having a single manually activated handle, means for mechanically coupling the handle to the valve assembly for sequentially mechanically activating the valve assembly to the vent, start and operate positions and for preventing direct activation of the valve assembly from the vent to operate positions to prevent compromising the vacuum of the filter.

12. Apparatus for enabling leaks of low molecular weight gas, such as helium, from equipment to be monitored by a gas analyzer responsive to the low molecular weight gas coupled to it through a filter, the apparatus comprising: a three position valve assembly having ports connected to an inlet conduit for receiving gas which may leak through equipment being tested, a roughing pump line, and a gas line, the assembly having: (1) a vent position wherein gas from the inlet conduit is blocked from the roughing pump line and the gas line so that the inlet conduit can be vented without having gas from the inlet conduit flow to the roughing pump line and the gas line, (2) a start position wherein gas from the inlet conduit flows to the roughing pump line while being blocked from the gas line, and (3) an operate position wherein gas from the inlet conduit flows to the roughing pump line and the low molecular weight gas flows from the inlet conduit to the analyzer through the gas line and gases of heavier molecular weight are substantially prevented by the gas line from flowing from the inlet conduit to the analyzer, the valve assembly having a single manually activated handle, means for mechanically coupling the handle to the valve assembly for sequentially mechanically activating the valve assembly to the vent, start and operate positions and for preventing direct activation of the valve assembly from the vent to operate positions to prevent compromising the vacuum of the filter.

13. The apparatus of claim 11 or 12 wherein the filter is connected between the analyzer and the valve assembly, a service valve connected between the filter and the analyzer, a vent valve in a line between the service valve and the analyzer, the valve assembly, service valve and vent valve being arranged so that: (1) the analyzer can be vented through the vent valve without having air flow from the vent valve to the filter, (2) the analyzer can be connected to the roughing line through the valve assembly while the valve assembly is in the start position without a gas flow path being established to the filter from either the analyzer or valve assembly, and (3) the analyzer is connected to the filter while the filter and roughing pump line are connected to the inlet conduit through the valve assembly and the valve assembly is in the operate position.

14. The apparatus of claim 11 or 12 wherein the filter is connected between the analyzer and the valve assembly, a service valve connected between the filter and the analyzer, a shunt conduit between the valve assembly and service valve, a vent valve in a line between the service valve and the analyzer, the valve assembly, service valve, shunt conduit and vent valve being arranged so that: (1) the analyzer can be vented through the vent valve without having air flow from the vent valve to the filter or to the valve assembly, (2) the analyzer can be connected to the roughing line through the shunt conduit to the valve assembly while the valve assembly is in the start position without a gas flow path being established to the filter from either the analyzer or valve assembly, and (3) the analyzer is connected to the filter while the filter and roughing pump line are connected to the inlet conduit through the valve assembly and the valve assembly is in the operate position.

15. The apparatus of claim 11 or 12 wherein the valve assembly includes first and second cams responsive to the handle position for respectively engaging first and second actuators for first and second valves, said first valve establishing: a gas flow path between a first port connected to the inlet conduit, a second port connected to the roughing pump line and a region within the valve assembly while the handle is in the start and operate positions but preventing gas flow between the first port and the region while the handle is in the vent position, said second valve establishing: a gas flow path between the region and a third port connected to the series connection while the handle is in the vent and operate positions but preventing gas flow between the region and the third port while the handle is in the start position; the filter being connected between the analyzer and the valve assembly, a service valve connected between the filter and the analyzer, a shunt conduit between the service valve and a portion of the valve assembly between the second and third ports, a vent valve in a line between the service valve and the analyzer; the valve assembly, service valve, shunt conduit and vent valve being arranged so that: (1) the analyzer can be vented through the vent valve without having air flow from the vent valve assembly, (2) the analyzer can be connected to the roughing line through the shunt conduit to the valve assembly while the valve assembly is in the start position without a gas flow path being established to the filter from either the analyzer or valve assembly, and (3) the analyzer is connected to the filter while the filter and roughing pump line are connected to the inlet conduit through the valve assembly and the valve assembly is in the operate position.

16. The apparatus of claim 11 or 12 wherein the valve assembly includes a cam shaft on which the handle is mounted, first and second coaxial cams longitudinally spaced from each other along and carried by the cam shaft so that turning of the handle results in turning of the cams, the first and second cams respectively engaging first and second actuators for first and second valves, said first valve establishing: a gas flow path between a first port connected to the inlet conduit, a second port connected to the roughing pump line and a region within the valve assembly while the handle is in the start and operate positions but preventing gas flow between the first port and the region while the handle is in the vent position; said second valve establishing: a gas flow path between the region and a third port connected to the series connection while the handle is in the vent and operate positions but preventing gas flow between the region and the third port while the handle is in the start position; the filter being connected between the analyzer and the valve assembly, a service valve connected between the filter and the analyzer, a shunt conduit between the service valve and a portion of the valve assembly between the second and third ports, a vent valve in a line between the service valve and the analyzer, the valve assembly, service valve, shunt conduit and vent valve being arranged so that: (1) the analyzer can be vented through the vent valve without having air flow from the vent valve assembly, (2) the analyzer can be connected to the roughing line through the shunt conduit to the valve assembly while the valve assembly is in the start position without a gas flow path being established to the filter from either the analyzer or valve assembly, and (3) the analyzer is connected to the filter while the filter and roughing pump line are connected to the inlet conduit through the valve assembly and the valve assembly is in the operate position.

17. The apparatus of claim 11 or 12 wherein the valve assembly includes a cam shaft on which the handle is mounted, first and second coaxial cams longitudinally spaced from each other along and carried by the cam shaft so that turning of the handle results in turning of the cams, the first and second cams respectively engaging first and second actuators for first and second valves, said first valve establishing: a gas flow path between a first port connected to the inlet conduit, a second port connected to the roughing pump line and a region within the valve assembly while the handle is in the start and operate positions but preventing gas flow between the first port and the region while the handle is in the vent position; said second valve establishing: a gas flow path between the region and a third port connected to the series connection while the handle is in the vent and operate positions but preventing gas flow between the region and the third port while the handle is in the start position; said cam shaft extending through a central portion of the region, said first and third ports being generally opposite from each other in the region, and on opposite sides of the cam shaft, said first and second cams extending in generally opposite directions from the cam shaft, the first and second actuators extending in straight lines in opposite directions from the region, the first and second valves being straight line projections in opposite directions from the actuators and extending out of the region into first and second conduits terminating at the first and third ports wherein the filter is connected between the analyzer and the valve assembly, a service valve connected between the filter and the analyzer, a shunt conduit between the service valve and a portion of the valve assembly between the second and third ports, a vent valve in a line between the service valve and the analyzer; the valve assembly, service valve, shunt conduit and vent valves being arranged so that: (1) the analyzer can be vented through the vent valve without having air flow from the vent valve assembly, (2) the analyzer can be connected to the roughing line through the shunt conduit to the valve assembly while the valve assembly is in the start position without a gas flow path being established to the filter from either the analyzer or valve assembly, and (3) the analyzer is connected to the filter while the filter and roughing pump line are connected to the inlet conduit through the valve assembly and the valve assembly is in the operate position.

18. Apparatus for analyzing leaks of low molecular weight gas, such as helium, from equipment to be monitored, said apparatus being adapted to be pumped by a roughing pump, said apparatus comprising: a gas analyzer, means for pumping the gas analyzer to a pressure substantially less than the pressure which can be produced by the roughing pump, the gas analyzer forming a series connection with the pumping means and responsive to the low molecular weight gas which may leak through equipment being monitroed, a three position valve assembly having ports connected to a roughing pump line, an inlet conduit for receiving gas which may pass through equipment being tested, and the series connection of the pumping means and analyzer, the assemby having: (1) a vent position wherein gas from the inlet conduit is blocked from the roughing pump line and the series connection of the pumping means and analyzer so that the inlet conduit can be vented without having gas from the inlet conduit flow to the roughing pump line and the series connection of the pumping means and analyzer, (2) a start position wherein gas from the inlet conduit flows to the roughing pump line while being blocked from the series connection of the pumping means and analyzer, and (3) an operate position wherein gas from the inlet conduit flows to the roughing pump line and the series connection of the pumping means and analyzer, the valve assembly having a single manually activated handle, means for mechanically coupling the handle to the valve assembly for sequentially mechanically activating the valve assembly to the vent, start and operate positions and for preventing direct activation of the valve assembly from the vent to operate positions to prevent compromising the vacuum of the series connection of the pumping means and analyzer.

19. The apparatus of claim 18 wherein the series connection includes a filter for preventing the flow of relatively heavy gas to the analyzer while enabling the flow of the relatively light gas to the analyzer.

20. The apparatus of claim 19 wherein the means for pumping and the filter together comprise a diffusion pump.

21. The apparatus of claim 20 wherein the analyzer is a mass spectrometer.

22. The apparatus of claim 18 or 19 or 20 wherein the means for mechanically coupling the handle to the valve assembly includes first and second cams responsive to the handle position for respectively engaging first and second actuators for first and second valves, said first valve establishing: a gas flow path between a first port connected to the inlet conduit, a second port connected to the roughing pump line and a region within the valve assembly while the handle is in the start and operate positions but preventing gas flow between the first port and the region while the handle is in the vent position; said second valve establishing: a gas flow path between the region and a third port connected to the series connection while the handle is in the vent and operate positions but preventing gas flow between the region and the third port while the handle is in the start position.

23. The apparatus of claim 18 or 19 or 20 wherein the means for mechanically coupling the handle to the valve assembly includes a cam shaft on which the handle is mounted, first and second coaxial cams longitudinally spaced from each other along and carried by the cam shaft so that turning of the handle results in turning of the cams, the first and second cams respectively engaging first and second actuators for first and second valves, said first valve establishing: a gas flow path between a first port connected to the inlet conduit and a second port connected to the roughing pump line and a region within the valve assembly while the handle is in the start and operate positions but preventing gas flow between the first port and the region while the handle is in the vent position; said second valve establishing: a gas flow path between the region and a third port connected to the series connection while the handle is in the vent and operate positions but preventing gas flow between the region and the third port while the handle is in the start position.

24. The apparatus of claim 18 or 19 or 20 wherein the means for mechanically coupling the handle to the valve assembly includes a cam shaft on which the handle is mounted, first and second coaxial cams longitudinally spaced from each other along and carried by the cam shaft so that turning of the handle results in turning of the cams, the first and second cams respectively engaging first and second actuators for first and second valve, said first valve establishing: a gas flow path between a first port connected to the inlet conduit, a second port connected to the roughing pump line and a region within the valve assembly, while the handle is in the start and operate positions but preventing gas flow between the first port and the region while the handle is in the vent position; said second valve establishing: a gas flow path between the region and a third port connected to the series connection while the handle is in the vent and operate positions but preventing gas flow between the region and the third port while the handle is in the start position, said cam shaft extending through a central portion of the region, said first and third ports being generally opposite from each other in the region and on opposite sides of the cam shaft, said first and second cams extending in generally opposite directions from the cam shaft, the first and second actuators extending in straight lines in opposite directions from the region, the first and second valves being straight line projections in opposite directions from the actuators and extending out of the region into first and second conduits terminating at the first and third ports.

25. The apparatus of claim 18 or 19 or 20 wherein the valve assembly includes first and second cams responsive to the handle position for respectively engaging first and second actuators for first and second valves, said first valve establishing: a gas flow path between a first port connected to the inlet conduits, a second port connected to the roughing pump line and a region within the valve assembly while the handle is in the start and operate positions but preventing gas flow between the first port and the region while the handle is in the vent position, said second valve establishing: a gas flow path between the region and a third port connected to the series connection while the handle is in the vent and operate positions but preventing gas flow between the region and the third port while the handle is in the start position; the means for pumping being connected between the analyzer and the valve assembly, a service valve connected between the means for pumping and the analyzer, a shunt conduit between the service valve and a portion of the valve assembly between the second and third ports, a vent line in a line between the service valve and the analyzer; the valve assembly, service valve, shunt conduit and vent valve being arranged so that: (1) the analyzer can be vented through the vent valve without having air flow from the vent valve assembly, (2) the analyzer can be connected to the roughing line through the shunt conduit to the valve assembly while the valve assembly is in the start position without a gas flow path being established to the means for pumping from either the analyzer or valve assembly, and (3) the analyzer is connected to the means for pumping while the means for pumping and roughing pump line are connected to the inlet conduit through the valve assembly and the valve assembly is in the operate position.

26. The apparatus of claim 18 or 19 or 20 wherein the valve assembly includes a cam shaft on which the handle is mounted, first and second coaxial cams longitudinally spaced from each other along and carried by the cam shaft so that turning of the handle results in turning of the cams, the first and second cams respectively engaging first and second actuators for first and second valves, said first valve establishing: a gas flow path between a first port connected to the inlet conduit, a second port connected to the roughing pump line and a region within the valve assembly while the handle is in the start and operate positions but preventing gas flow between the first port and the region while the handle is in the vent position; said second valve establishing: a gas flow path between the region and a third port connected to the series connection while the handle is in the vent and operate positions but preventing gas flow between the region and the third port while the handle is in the start position; the means for pumping being connected between the analyzer and the valve assembly, a service valve connected between the means for pumping and the analyzer, a shunt conduit between the service valve and a portion of the valve assembly between the second and third ports, a vent valve in a line between the service valve and the analyzer, the valve assembly, service valve, shunt conduit and vent valve being arranged so that: (1) the analyzer can be vented through the vent valve without having air flow from the vent valve assembly, (2) the analyzer can be connected to the roughing line through the shunt conduit to the valve assembly while the valve assembly is in the start position without a gas flow path being established to the means for pumping from either the analyzer or valve assembly, and (3) the analyzer is connected to the means for pumping while the means for pumping and roughing pump line are connected to the inlet conduit through the valve assembly and the valve assembly is in the operate position.

27. The apparatus of claim 18 or 19 or 20 wherein the valve assembly includes a cam shaft on which the handle is mounted, first and second coaxial cams longitudinally spaced from each other along and carried by the cam shaft so that turning of the handle results in turning of the cams, the first and second cams respectively engaging first and second actuators for first and second valves, said first valve establishing: a gas flow path between a first port connected to the inlet conduit, a second port connected to the roughing pump line and a region within the valve assembly while the handle is in the start and operate positions but preventing gas flow between the first port and the region while the handle is in the vent position; said second valve establishing: a gas flow path between the region and a third port connected to the series connection while the handle is in the vent and operate positions, but preventing gas flow between the region and the third port while the handle is in the start position; said cam shaft extending through a central portion of the region, said first and third ports being generally opposite from each other in the region, and on opposite sides of the cam shaft, said first and second cams extending in generally opposite directions from the cam shaft, the first and second actuators extending in straight lines in opposite directions from the region, the first and second valves being straight line projections in opposite directions from the actuators and extending out of the region into first and second conduits terminating at the first and third ports, wherein the means for pumping is connected between the analyzer and the valve assembly, a service valve connected between the means for pumping and the analyzer, a shunt conduit between the service valve and a portion of the valve assembly between the second and third ports, a vent valve in a line between the service valve and the analyzer; the valve assembly, service valve, shunt conduit and vent valves being arranged so that: (1) the analyzer can be vented through the vent valve without having air flow from the vent valve assembly, (2) the analyzer can be connected to the roughing line through the shunt conduit to the valve assembly while the valve assembly is in the start position without a gas flow path being established to the means for pumping from either the analyzer or valve assembly, and (3) the analyzer is connected to the means for pumping while the means for pumping and roughing pump line are connected to the inlet conduit through the valve assembly and the valve assembly is in the operate position.

28. The apparatus of claim 20 wherein the handle and the means for coupling are connected to the assembly to drive the assembly to a further position between the vent and start positions such that gas from the mass spectrometer can be pumped by the diffusion pump through the diffusion pump inlet and can be pumped from the diffusion pump foreline to the roughing pump line while the roughing line is decoupled from the inlet conduit.

29. The apparatus of claim 28 wherein the means for mechanically coupling the handle to the valve assembly includes first and second cams responsive to the handle position for respectively engaging first and second actuators for first and second valve seats, said first valve seat establishing: a gas flow path between a first port connected to the inlet conduit, a second port connected to the roughing pump line and a region within the valve assembly while the handle is in the start and operate positions but preventing gas flow between the first port and the region while the handle is in the vent and further positions; said second valve seat establishing: a gas flow path between the region and a third port connected to the series connection while the handle is in the vent, operate and further positions but preventing gas flow between the region and the third port while the handle is in the start position.

30. The apparatus of claim 28 wherein the means for mechanically coupling the handle to the valve assembly includes a cam shaft on which the handle is mounted, first and second coaxial cams longitudinally spaced from each other along and carried by the cam shaft so that turning of the handle results in turning of the cams, the first and second cams respectively engaging first and second actuators for first and second valves, said first valve establishing: a gas flow path between a first port connected to the inlet conduit, a second port connected to the roughing pump line and a region within the valve assembly, while the handle is in the start and operate positions but preventing gas flow between the first port and the region while the handle is in the vent and further positions; said second valve establishing: a gas flow path between the region and a third port connected to the series connection while the handle is in the vent, operate and further positions but preventing gas flow between the region and the third port while the handle is in the start position.

31. The apparatus of claim 28 wherein the means for mechanically coupling the handle to the valve assembly includes a cam shaft on which the handle is mounted, first and second coaxial cams longitudinally spaced from each other along and carried by the cam shaft so that turning of the handle results in turning of the cams, the first and second cams respectively engaging first and second actuators for first and second valves, said first valve establishing: a gas flow path between a first port connected to the inlet conduit, a second port connected to the roughing pump line and a region within the valve assembly while the handle is in the start and operate positions; said second valve establishing: a gas flow path between the region and a third port connected to the series connection while the handle is in the vent, operate and further positions but preventing gas flow between the region and the third port while the handle is in the start position, said cam shaft extending through a central portion of the region, said first and third ports being generally opposite from each other in the region and on opposite sides of the cam shaft, said first and second cams extending in generally opposite directions from the cam shaft, the first and second actuators extending in straight lines in opposite directions from the region, the first and second valves being straight line projections in opposite directions from the actuators and extending out of the region into first and second conduits terminating at the first and third ports.

32. The apparatus of claim 18 or 19 or 20 or 21 wherein the means for pumping is connected between the analyzer and the valve assembly, a service valve connected between the means for pumping and the analyzer, a vent valve in a line between the service valve and the analyzer, the valve assembly, service valve and vent valve being arranged so that: (1) the analyzer can be vented through the vent valve without having air flow from the vent valve to the means for pumping or the valve assembly, (2) the analyzer can be connected to the roughing line through the valve assembly while the valve assembly is in the start position without a gas flow path being established to the means for pumping from either the analyzer or valve assembly, and (3) the analyzer is connected to the means for pumping while the means for pumping and roughing pump line are connected to the inlet conduit through the valve assembly and the valve assembly is in the operate position.

33. The apparatus of claim 18 or 19 or 20 or 21 wherein the means for pumping is connected between the analyzer and the valve assembly, a service valve connected between the pumping means and the analyzer, a shunt conduit between the valve assembly and service valve, a vent valve in a line between the service valve and the analyzer, the valve assembly, service valve, shunt conduit and vent valve being arranged so that: (1) the analyzer can be vented through the vent valve without having air flow from the vent valve to the pumping means or to the valve assembly, (2) the analyzer can be connected to the roughing line through the shunt conduit to the valve assembly while the valve assembly is in the start position without a gas flow path being established to the pumping means from either the analyzer or valve assembly, and (3) the analyzer is connected to the pumping means while the pumping means and roughing pump line are connected to the inlet conduit through the valve assembly and the valve assembly is in the operate position.

34. Apparatus for enabling leaks of low molecular weight gas, such as helium, from equipment to be monitored by a gas analyzer responsive to the low molecular weight gas coupled to it through a filter, the apparatus comprising: a three position valve assembly having ports connected to an inlet conduit adapted to receive gas which may leak through equipment being tested, a roughing pump line, and a gas line connected to the filter, the assembly having: (1) a vent position wherein gas from the inlet conduit is blocked from the roughing pump line and the gas line so that the inlet conduit can be vented without having gas from the inlet conduit flow to the roughing pump line and the gas line, (2) a start position wherein gas from the inlet conduit flow to the roughing pump line while being blocked from the gas line, and (3) an operate position wherein gas from the inlet conduit flows to the roughing pump line and the low molecular gas flows from the inlet conduit to the analyzer through the gas line and gases of heavier molecular weight are substantially prevented by the gas line from flowing from the inlet conduit to the analyzer, a single manually activated handle, means for mechanically coupling the handle to the valve assembly for sequentially activating the valve assembly to the vent, start and operate positions and for preventing direct activation of the valve from the vent to the operate position to prevent compromising the vacuum of the gas line, the valve assembly including first and second coaxial cams connected to the handle by the means for mechanically coupling, the first and second cams respectively engaging first and second actuators for first and second valves, said first valve establishing: a gas flow path between a first port connected to the inlet conduit, a second port connected to the roughing pump line and a region within the valve assembly while the handle is in the start and operate positions but preventing gas flow between the first port and the region while the handle is in the vent position; said second valve establishing: a gas flow path between the region and a third port connected to the series connection while the handle is in the operate position but preventing gas flow between the region and the third port while the handle is in the vent and start positions.

35. Apparatus for enabling leaks of low molecular weight gas, such as helium, from equipment to be monitored by a gas analyzer responsive to the low molecular weight gas coupled to it through a filter, the apparatus comprising: a three position valve assembly having ports connected to an inlet conduit adapted to receive gas which may flow through equipment being tested, a roughing pump line, and a gas line connected to the filter, the assembly having: (1) a vent position wherein gas from the inlet conduit is blocked from the roughing pump line and the gas line so that the inlet conduit can be vented without having gas from the inlet conduit flow to the roughing pump line and the gas line, (2) a start position wherein gas from the vacuum equipment flows to the roughing pump line while being blocked from the gas line, and (3) an operate position wherein gas from the inlet conduit flows to the roughing pump line and the low molecular weight gas flows from the inlet conduit to the analyzer through the gas line and gases of heavier molecular weight are substantially prevented by the gas line from flowing through the inlet conduit to the analyzer, a single manually activated handle, means for mechanically coupling the handle to the valve assembly for sequentially activating the valve assembly to the vent, start and operate positions and for preventing direct activation of the valve from the vent to the operate position to prevent compromising the vacuum of the gas line, the valve assembly including a cam shaft mechanically connected to the handle to be driven by the handle, first and second coaxial cams longitudinally spaced from each other along and carried by the cam shaft so that turning of the shaft by the handle results in turning of the cams, the first and second cams respectively engaging first and second actuators for first and second valves, said first valve establishing: a gas flow path between a first port connected to the equipment, a second port connected to the roughing pump line and a region within the valve assembly, while the handle is in the start and operate positions but preventing gas flow between the first port and the region while the handle is in the vent position: said second valve establishing: a gas flow path between the region and a third port connected to the series connection while the handle is in the operate position but preventing gas flow between the region and the third port while the handle is in the vent and start positions.

36. Apparatus for enabling leaks of low molecular weight gas, such as helium, from equipment to be monitored for leaks by a gas analyzer responsive to the low molecular weight gas coupled to it through a filter, the apparatus comprising: a three position valve assembly having ports connected to an inlet conduit adapted to receive gas which may leak through equipment being tested, a roughing pump line, and a gas line connected to the filter, the assembly having: (1) a vent position wherein gas from the equipment inlet conduit is blocked from the roughing pump line and the gas line so that the inlet conduit can be vented without having gas from the inlet conduit flow to the roughing pump line and the gas line, (2) a start position wherein gas from the inlet conduit flows to the roughing pump line while being blocked from the gas line, and (3) an operate position wherein gas from the inlet conduit flows to the roughing pump line and the low molecular gas flows from the inlet conduit to the analyzer through the gas line and gases of heavier molecular weight are substantially prevented by the gas line from flowing from the inlet conduit to the analyzer, the valve assembly having an activator for sequentially activating the valve assembly to the vent, start and operate positions to prevent compromising the vacuum of the filter, the valve assembly including a cam shaft driven by the activator, first and second coaxial cams longitudinally spaced from each other along and carried by the cam shaft so that turning of the shaft by the activator results in turning of the cams, the first and second cams respectively engaging first and second actuators for first and second valves, said first valve establishing: a gas flow path between a first port connected to the inlet conduit, a second port connected to the roughing pump line and a region within the valve assembly while the activator is in the start and operate positions but preventing gas flow between the first port and the region while the activator is in the vent position; said second valve establishing: a gas flow path between the region and a third port connected to the series connection while the activator is in the operate position but preventing gas flow between the region and the third port while the activator is in the vent and start positions, said cam shaft extending through a central portion of the region, said first and third ports being generally opposite from each other in the region and on opposite sides of the cam shaft, said first and second cams extending in generally opposite directions from the cam shaft, the first and second actuators extending in straight lines in opposite directions from the region, the first and second valves being straight line projections in opposite directions from the actuators and extending out of the region into first and second conduits terminating at the first and third ports.

37. Apparatus for enabling leaks of low molecular weight gas, such as helium, from equipment to be monitored by a gas analyzer responsive to the low molecular weight gas coupled to it through a filter, the apparatus comprising: a three position valve assembly having ports connected to an inlet conduit adapted to receive gas which may leak through equipment being tested, a roughing pump line, and a gas line conected to the filter, the assembly having: (1) a vent position wherein gas from the inlet conduit is blocked from the roughing pump line and the gas line so that the inlet conduit can be vented without having gas from the inlet conduit flow to the roughing pump line and the gas line, (2) a start position wherein gas from the inlet conduit flows to the roughing pump line while being blocked from the gas line, and (3) an operate position wherein gas from the inlet conduit flows to the roughing pump line and the low molecular gas flows from the inlet conduit to the analyzer through the gas line and gases of heavier molecular weight are substantially prevented by the gas line from flowing from the inlet conduit to the analyzer, the valve assembly having an activator for activating the valve assembly to the vent, start and operate positions, the filter being connected between the analyzer and the valve assembly, a service valve connected between the filter and the analyzer, a vent valve in a line between the service valve and the analyzer, the valve assembly, service valve and vent valve being arranged so that: (1) the analyzer can be vented through the vent valve without having air flow from the vent valve to the filter, (2) the analyzer can be connected to the roughing line through the valve assembly while the valve assembly is in the start position without a gas flow path being established to the filter from either the analyzer or valve assembly, and (3) the analyzer is connected to the filter while the filter and roughing pump line are connected to the inlet conduit through the valve assembly and the valve assembly is in the operate position.

38. Apparatus for enabling leaks of low molecular weight gas, such as helium, from equipment to be monitored by a gas analyzer responsive to the low molecular weight gas coupled to it through a filter, the apparatus comprising: a three position valve assembly having ports connected to an inlet conduit adapted to receive has which may leak through equipment being tested, a roughing pump line, and a gas line connected to the filter, the assembly having: (1) a vent position wherein gas from the inlet conduit is blocked from the roughing pump line and the gas line so that the inlet conduit can be vented without having gas from the inlet conduit flow to the roughing pump line and the gas line, (2) a start position wherein gas from the inlet conduit flows to the roughing pump line while being blocked from the gas line, and (3) an operate position wherein gas from the inlet conduit flows to the roughing pump line and the low molecular gas flows from the inlet conduit to the analyzer through the gas line and gases of heavier molecular weight are substantially prevented by the gas line from flowing from the inlet conduit to the analyzer, the valve assembly having an activator for activating the valve assembly to the vent, start and operate positions, the filter being connected between the analyzer and the valve assembly, a service valve connected between the pumping means and the analyzer, a shunt conduit between the valve assembly and service valve, a vent valve in a line between the service valve and the analyzer, the valve assembly service valve, shunt conduit and vent valve being arranged so that: (1) the analyzer can be vented through the vent valve without having air flow from the vent valve to the filter or to the valve assembly, (2) the analyzer can be connected to the roughing line through the shunt conduit to the valve assembly while the valve assembly is in the start position without a gas flow path being established to the filter from either the analyzer or valve assembly, and (3) the analyzer is connected to the filter while the filter and roughing pump line are connected to the inlet conduit through the valve assembly and the valve assembly is in the operate position.

39. Apparatus for enabling leaks of low molecular weight gas, such as helium, from equipment to be monitored by a gas analyzer responsive to the low molecular weight gas coupled to it through a filter, the apparatus comprising: a three position valve assembly having ports connected to an inlet conduit adapted to receive gas which may leak through equipment being tested, a roughing pump line, and a gas line connected to the filter, the assembly having: (1) a vent position wherein gas from the inlet conduit is blocked from the roughing pump line and the gas line so that the inlet conduit can be vented without having gas from the equipment flow to the roughing pump line and the gas line, (2) a start position wherein gas from the inlet conduit flows to the roughing pump line while being blocked from the gas line, and (3) an operate position wherein gas from the inlet conduit flows to the roughing pump line and the low molecular gas flows from the inlet conduit to the analyzer through the gas line and gases of heavier molecular weight are substantially prevented by the gas line from flowing from the inlet conduit to the analyzer, the valve assembly having an activator for activating the valve assembly to the vent, start and operate positions, the valve assembly including first and second coaxial cams responsive to the activator position for respectively engaging first and second actuators for first and second valves, said first valve establishing: a gas flow path between a first port connected to the roughing pump line and a region within the valve assembly while the activator is in the start and operate positions but preventing gas flow between the first port and the region while the activator is in the vent position, said second valve establishing: a gas flow path between the region and a third port connected to the series connection while the activator is in the operate position but preventing gas flow between the region and the third port while the activator is in the vent and start positions; the filter being connected between the analyzer and the valve assembly, a service valve connected between the filter and the analyzer, a shunt conduit between the service valve and a portion of the valve assembly between the second and third ports, a vent valve in a line between the service valve and the analyzer; the valve assembly, service valve, shunt conduit and vent valve being arranged so that: (1) the analyzer can be vented through the vent valve without having air flow from the vent valve assembly, (2) the analyzer can be connected to the roughing line through the shunt conduit to the valve assembly while the valve assembly is in the start position without a gas flow path being established to the filter from either the analyzer or valve assembly, and (3) the analyzer is connected to the filter while the filter and roughing pump line are connected to the inlet conduit through the valve assembly and the valve assembly is in the operate position.

40. Apparatus for enabling leaks of low molecular weight gas, such as helium, from equipment to be monitored by a gas analyzer responsive to the low molecular weight gas coupled to it through a filter, the apparatus comprising: a three position valve assembly having ports connected to an inlet conduit adapted to receive gas which may leak through equipment being tested, a roughing pump line, and a gas line connected to the filter, the assembly having: (1) a vent position wherein gas from the inlet conduit is blocked from the roughing pump line and the gas line so that the inlet conduit can be vented without having gas from the inlet conduit flow to the roughing pump line and the gas line, (2) a start position wherein gas from the inlet conduit flows to the roughing pump line while being blocked from the gas line, and (3) an operate position wherein gas from the inlet conduit flows to the roughing pump line and the low molecular gas flows from the inlet conduit to the analyzer through the gas line and gases of heavier molecular weight are substantially prevented by the gas line from flowing from the inlet conduit to the analyzer, the valve assembly having an activator for activating the valve assembly to the vent, start and operate positions, the valve assembly including a cam shaft driven by the activator, first and second coaxial cams longitudinally spaced from each other along and carried by the cam shaft so that turning of the shaft by the activator results in turning of the cams, the first and second cams respectively engaging first and second actuators for first and second valves, said first valve establishing: a gas flow path between a first port connected to the inlet conduit, a second port connected to the roughing pump line and a region within the valve assembly while the activator is in the start and operate positions but preventing gas flow between the first port and the region while the activator is in the vent position; said second valve establishing: a gas flow path between the region and a third port connected to the series connection while the handle is in the operate position but preventing gas flow between the region and the third port while the activator is in the vent and start positions, the filter being connected between the analyzer and the valve assembly, a service valve connected between the filter and the analyzer, a shunt conduit between the service valve and a portion of the valve assembly between the second and third ports, a vent valve in a line between the service valve and the analyzer, the valve assembly, service valve, shunt conduit and vent valve being arranged so that: (1) the analyzer can be vented through the vent valve without having air flow from the vent valve assembly, (2) the analyzer can be connected to the roughing line through the shunt conduit to the valve assembly while the valve assembly is in the start position without a gas flow path being established to the filter from either the analyzer or valve assembly, and (3) the analyzer is connected to the filter while the filter and roughing pump line are connected to the inlet conduit through the valve assembly and the valve assembly is in the operate position.

41. Apparatus for enabling leaks of low molecular weight gas, such as helium, from equipment to be monitored by a gas analyzer responsive to the low molecular weight gas coupled to it through a filter, the apparatus comprising: a third position valve assembly having ports connected to an inlet conduit adapted to receive gas which may leak through equipment being tested, a roughing pump line, and a gas line connected to the filter, the assembly having (1) a vent position wherein gas from the inlet conduit is blocked from the roughing pump line and the gas line so that the inlet conduit can be vented without having gas from the inlet conduit flow to the roughing pump line and the gas line, (2) a start position wherein gas from the inlet conduit flows to the roughing pump line while being blocked from the gas line, and (3) an operate position wherein gas from the inlet conduit flows to the roughing pump line and the low molecular gas flows from the inlet conduit to the analyzer through the gas line and gases of heavier molecular weight are substantially prevented by the gas line from flowing from the inlet conduit to the analyzer, the valve assembly having an activator for activating the valve assembly to the vent, start and operate positions, the valve assembly including a cam shaft on which the activator is mounted, first and second coaxial cams longitudinally spaced from each other along and carried by the cam shaft so that turning of the shaft by the activator results in turning of the cams, the first and second cams respectively engaging first and second actuators for first and second valves, said first valve establishing: a gas flow path between a first port connected to the inlet conduit, a second port connected to the roughing pump line and a region within the valve assembly while the activator is in the start and operate positions but preventing gas flow between the first port and the region while the activator is in the vent position; said second valve establishing: a gas flow path between the region and a third port connected to the series connection while the activator is in the operate position but preventing gas flow between the region and the third port while the activator is in the vent and start positions; said cam shaft extending through a central portion of the region, said first and third ports being generally opposite from each other in the region, and on opposite sides of the cam shaft, said first and second cams extending in generally opposite directions from the cam shaft, the first and second actuators extending in straight lines in opposite directions from the region, the first and second valves being straight line projections in opposite directions from the actuators and extending out of the region into first and second conduits terminating at the first and third ports wherein the filter is connected between the analyzer and the valve assembly, a service valve connected between the filter and the analyzer, a shunt conduit between the service valve and a portion of the valve assembly between the second and third ports, a vent valve in a line between the service valve and the analyzer; the valve assembly, service valve, shunt conduit and vent valves being arranged so that: (1) the analyzer can be vented through the vent valve without having air flow from the vent valve assembly, (2) the analyzer can be connected to the roughing line through the shunt conduit to the valve assembly while the valve assembly is in the start position without a gas flow path being established to the filter from either the analyzer or valve assembly, and (3) the analyzer is connected to the filter while the filter and roughing pump line are connected to the inlet conduit through the valve assembly and the valve assembly is in the operate position.

42. The apparatus of claims 34, 35, 36, 37, 38, 39, 40 or 41 wherein the filter comprises a diffusion pump.

43. Apparatus for enabling leaks of low molecular weight gas, such as helium, from equipment to be monitored by a gas analyzer responsive to the low molecular weight gas coupled to it through a diffusion pump, the apparatus comprising: a three position valve assembly having ports connected to an inlet conduit adapted to receive gas which may leak through equipment being tested, a roughing pump line, and a gas line connected to the diffusion pump, the assembly having: (1) a vent position wherein gas from the inlet conduit is blocked from the roughing pump line and the gas line so that the inlet conduit can be vented without having gas from the inlet conduit flow to the roughing pump line and the gas line, (2) a start position wherein gas from the inlet conduit flows to the roughing pump line while being blocked from the gas line, and (3) an operate position wherein gas from the inlet conduit flows to the roughing pump line and the low molecular gas flows from the inlet conduit to the analyzer through the gas line and gases of heavier molecular weight are substantially prevented by the gas line from flowing from the inlet conduit to the analyzer, the valve assembly having an activator for activating the valve assembly to the vent, start and operate positions, the assembly having a further position between the vent and start positions such that gas from the gas analyzer can be pumped by the diffusion pump through the diffusion pump inlet and can be pumped from the diffusion pump foreline to the roughing pump line while the roughing line is decoupled from the inlet conduit the valve assembly including a cam shaft responsive to the activator, first and second coaxial cams longitudinally spaced from each other along and carried by the cam shaft so that turning of the shaft results in turning of the cams, the first and second cams respectively engaging first and second actuators for first and second valves, said first valve establishing: a gas flow path between a first port connected to the inlet conduit, a second port connected to the roughing pump line and a region within the valve assembly while the activator is in the start, operate and further positions but preventing gas flow between the first port and the region while the activator is in the vent position; said second valve establishing: a gas flow path between the region and a third port connected to the series connection while the activator is in the operate and further positions but preventing gas flow between the region and the third port while the activator is in the vent and start positions, the means for pumping being connected between the analyzer and the valve assembly, a service valve connected between the diffusion pump and the spectrometer, a shunt conduit between the service valve and a portion of the valve assembly between the second and third ports, a vent valve in a line between the service valve and the analyzer, the valve assembly, service valve, shunt conduit and vent valve being arranged so that: (1) the spectrometer can be vented through the vent valve without having air flow from the vent valve assembly, (2) the analyzer can be connected to the roughing line through the shunt conduit to the valve assembly while the valve assembly is in the start position without a gas flow path being established to the diffusion pump from either the analyzer or valve assembly, and (3) the analyzer is connected to the diffusion pump while the diffusion pump and roughing pump line are connected to the inlet conduit through the valve assembly and the valve assembly is in the operate position.

44. Apparatus for enabling leaks of low molecular weight gas, such as helium, from equipment to be monitored by a gas analyzer responsive to the low molecular weight gas coupled to it through a diffusion pump, the apparatus comprising: a three position valve assembly having ports connected to an inlet conduit adapted to receive gas which may leak through equipment being tested, a roughing pump line, and a gas line connected to the diffusion pump, the assembly having: (1) a vent position wherein gas from the inlet conduit is blocked from the roughing pump line and the gas line so that the equipment can be vented without having gas from the inlet conduit flow to the roughing pump line and the gas line, (2) a start position wherein gas from the inlet conduit flows to the roughing pump line while being blocked from the gas line, and (3) an operate position wherein gas from the inlet conduit flows to the roughing pump line and the low molecular gas flows from the inlet conduit to the analyzer through the gas line and gases of heavier molecular weight are substantially prevented by the gas line from flowing from the inlet conduit to the analyzer, the valve assembly having an activator for activating the valve assembly to the vent, start and operate positions, the assembly having a further position between the vent and start positions such that gas from the analyzer can be pumped by the diffusion pump through the diffusion pump inlet and can be pumped from the diffusion pump foreline to the roughing pump line while the roughing line is decoupled from the vacuum equipment, the valve assembly including a cam shaft responsive to the activator, first and second coaxial cams longitudinally spaced from each other and carried by the cam shaft so that turning of the shaft results in turning of the cams, the first and second cams respectively engaging first and second actuators for first and second valves, said first valve establishing: a gas flow path between a first port connected to the inlet conduit, a second port connected to the roughing pump line and a region within the valve assembly while the activator is in the start, operate and further positions but preventing gas flow between the first port and the region while the activator is in the vent position; said second valve establishing: a gas flow path between the region and a third port connected to the series connection while the activator is in the operate and further positions but preventing gas flow between the region and the third port while the activator is in the vent and start positions; said cam shaft extending through a central portion of the region, said first and third ports being generally opposite from each other in the region, and on opposite sides of the cam shaft, said first and second cams extending in generally opposite directions from the cam shaft, the first and second actuators extending in straight lines in opposite directions from the region, the first and second valves being straight line projections in opposite directions from the actuators and extending out of the region into first and second conduits terminating at the first and third ports, wherein the means for pumping is connected between the analyzer and the valve assembly, a service valve connected between the diffusion pump and the analyzer, a shunt conduit between the service valve and a portion of the valve assembly between the second and third ports, a vent valve in a line between the service valve and the analyzer; the valve assembly, service valve, shunt conduit and vent valve being arranged so that: (1) the analyzer can be vented through the vent valve without having air flow from the vent valve assembly, (2) the analyzer can be connected to the roughing line through the shunt conduit to the valve assembly while the valve assembly is in the start position without a gas flow path being established to the diffusion pump from either the analyzer or valve assembly, and (3) the analyzer is connected to the diffusion pump while the diffusion pump and roughing pump line are connected to the inlet conduit through the valve assembly and the valve assembly is in the operate position.

45. Leak detector apparatus for a trace gas, such as helium, which may leak through equipment to be monitored, comprising a roughing pump, a filter for passing the trace gas to the exclusion of certain other gases, a gas detector connected to the filter to be responsive to the trace gas passed by the filter, and a valve assembly; said valve assembly having:
(a) an inlet passage for receiving the trace gas from the leaking equipment;
(b) a first valve for selectively coupling gas in said inlet passage to a region within said valve assembly;
(c) said region being connected in fluid flow relation with said roughing pump;
(d) a second valve for selectively coupling gas flow between said region and a first port of said filter, said filter having a second port connected to said gas detector;
(e) a single control handle manually operable for movement to vent, start and operate positions;
(f) completely mechanical means actuated solely by movement of said single control handle for causing the complete operation of said first and second valves, said complete operation being such that when said handle is in the vent position said first valve is closed and said second valve is open so the trace gas does not flow to the region while said roughing pump and filter are connected in fluid flow relation via the region, when said handle is in the start position said first valve is open and second valve is closed so gas flows from the inlet passage to the roughing pump via the region and gas does not flow between the region and the filter, and when said handle is in the operate position said first and second valves both are open so the gas flows from the inlet passage to the filter via the region;
(g) means associated with said handle for enabling sequential movement of the handle and mechanical means from the vent to the start and thence to the operate positions while preventing movement of the handle and mechanical means from said vent position to said operate position without first reaching said start position; and
(h) said completely mechanical means being arranged to close said second valve before said first valve opens as said handle moves from said vent position to said start position.

46. The apparatus of claim 45 further comprising a port for venting said inlet passage to atmosphere, said port being located between an inlet of said inlet passage and said first valve, a third valve controlling passage of gas through said port, and mechanical means actuated by movement of said single handle to cause said third valve to be opened while said handle is in the vent position.

47. The apparatus of claim 46 wherein said single handle is movable to a position intermediate said start and vent positions, in response to said handle being in the intermediate position said first and second valves being in the same conditions as they are in said vent position, but said third valve being closed.

48. The apparatus of claim 45, 46 or 47 wherein the filter is a high vacuum pump.

49. The apparatus of claim 48 wherein the high vacuum pump comprises a diffusion pump having a foreline and an inlet respectively connected to said region and said detector.

50. The apparatus of claim 45, 46 or 47 wherein said mechanical means actuated by movement of said handle comprises a rotatably mounted shaft to which said handle is attached, locating means for positioning said handle in said vent, start and operate positions, said locating means being such as to permit rotation of said handle from start directly to operate and from start directly to vent, and to accomplish said preventing of rotation from vent directly to operate.

51. The apparatus of claim 50 wherein the filter is a high vacuum pump.

52. The apparatus of claim 51 wherein the high vacuum pump comprises a diffusion pump having a foreline and an inlet respectively connected to said region and said detector.

53. The apparatus of claim 45, 46 or 47 further comprising means forming a first conduit for connecting said gas detector to said second port of the filter to couple the passed gas to the detector, means for selectively connecting said first conduit to said region in the valve assembly, said last named means including a second conduit and valve means adjustable to a first position preventing gas flow between said first conduit and both said second port of the filter and said second conduit, said valve means being further adjustable to a second position permitting gas flow between said first conduit and said second port of the filter while preventing gas flow between said first conduit and said second conduit, said valve means being further adjustable to a third position interconnecting both said first and second conduits while disconnecting both said first and second conduits from said second port of the filter, and valve means operable to vent said first conduit to atmosphere.

54. The apparatus of claim 53 wherein the filter is a high vacuum pump.

55. The apparatus of claim 54 wherein the high vacuum pump comprises a diffusion pump having a foreline and an inlet respectively connected to said region and said detector.

56. Leak detector apparatus for a trace gas, such as helium, which may leak through equipment to be monitored comprising a roughing pump, a filter for selectively passing the trace gas, a gas detector connected to the filter to be responsive to the trace gas passed by the filter, and a gas flow control system, said gas flow control system including: means forming an inlet for receiving the trace gas leaking from the equipment, passageway means for connecting said inlet to said roughing pump and to a first port of said filter, first valve means for controlling gas flow between said inlet and said passageway means, second valve means for controlling gas flow through said passageway means from said first valve means to the first port of the filter, means forming a first conduit for connecting said gas detector to a second port of the filter, means forming a second conduit for connecting said first conduit to said passageway means, third valve means adjustable to a first position for preventing gas flow between said first conduit and both said second port of the filter and said second conduit, said third valve means being further adjustable to a second position permitting gas flow between said first conduit and said second port of the filter while preventing gas flow between said first conduit and said second conduit, said third valve means being further adjustable to a third position interconnecting said first and second conduits and disconnecting both said first and second conduits from said second port of the filter.

57. Leak detector apparatus as claimed in claim 56 including means for venting said first conduit to atmosphere.

58. The apparatus of claim 56 or 57 wherein the filter is a high vacuum pump having first and second ports respectively forming the said first and second ports of the filter.

59. The apparatus of claim 58 wherein the high vacuum pump comprises a diffusion pump having a foreline and an inlet respectively connected to the first and second ports.

* * * * *